United States Patent [19]

Specht et al.

[11] Patent Number: 5,129,679

[45] Date of Patent: Jul. 14, 1992

[54] LOCKING DEVICE AND VEHICLE SAFETY BELT TIGHTENING APPARATUS

[75] Inventors: Martin Specht, Feldafing; Rudolf Meyer, Odelzhausen, both of Fed. Rep. of Germany

[73] Assignee: HS Technik und Design Technische Entwicklungen GmbH, Munich, Fed. Rep. of Germany

[21] Appl. No.: 521,044

[22] Filed: May 9, 1990

[30] Foreign Application Priority Data

| May 13, 1989 | [DE] | Fed. Rep. of Germany | 3915723 |
| Sep. 26, 1989 | [DE] | Fed. Rep. of Germany | 3932090 |
| Oct. 3, 1989 | [DE] | Fed. Rep. of Germany | 3933009 |
| Oct. 5, 1989 | [DE] | Fed. Rep. of Germany | 3933276 |
| Apr. 5, 1990 | [EP] | European Pat. Off. | 90106535.9 |

[51] Int. Cl.$^5$ .............................. B60R 22/32
[52] U.S. Cl. ........................ 280/806; 297/480
[58] Field of Search ............ 280/806, 801, 808; 297/480, 468

[56] References Cited

U.S. PATENT DOCUMENTS

| 4,917,210 | 4/1990 | Danicek | 280/806 |
| 4,999,004 | 3/1991 | Skanberg | 280/806 |

Primary Examiner—Charles A. Marmor
Assistant Examiner—Karin Tyson
Attorney, Agent, or Firm—Fleit, Jacobson, Cohn, Price, Holman & Stern

[57] ABSTRACT

A locking device for securing at least first and second members which are movable relative to each other in response to a force acting thereon, in a locked rest position, with a release mechanism for releasing the members from their locked position, includes a locking element providing at least first and second support locations at which respective ones of the first and second mutually relatively movable members bear against the locking element to hold them in a locked condition. The co-operation of the locking element and one of the mutually relatively movable members provides a pivot axis about which the locking element is pivotable under the effect of an unlocking moment, to provide a release action. The device further includes a stationary stop means against which, in the locked position, the locking element bears due to the unlocking moment applied thereto. The first and second members, in the locked position thereof, and the locking element, combine to form a motion unit which is movable under the effect of an external force acting thereon, away from the stop means, at least to such an extent that locking element is released from the stop means. The locking device can be incorporated into an apparatus for tightening the safety belt in a vehicle by removing slack from the safety belt.

31 Claims, 17 Drawing Sheets

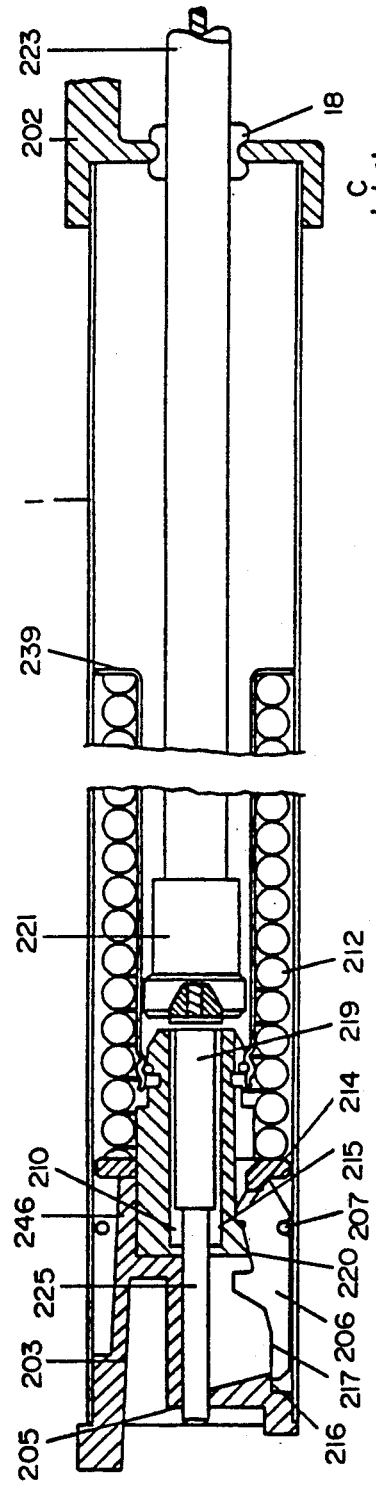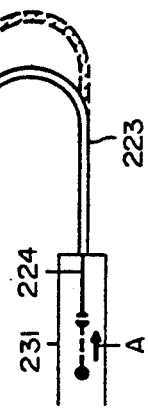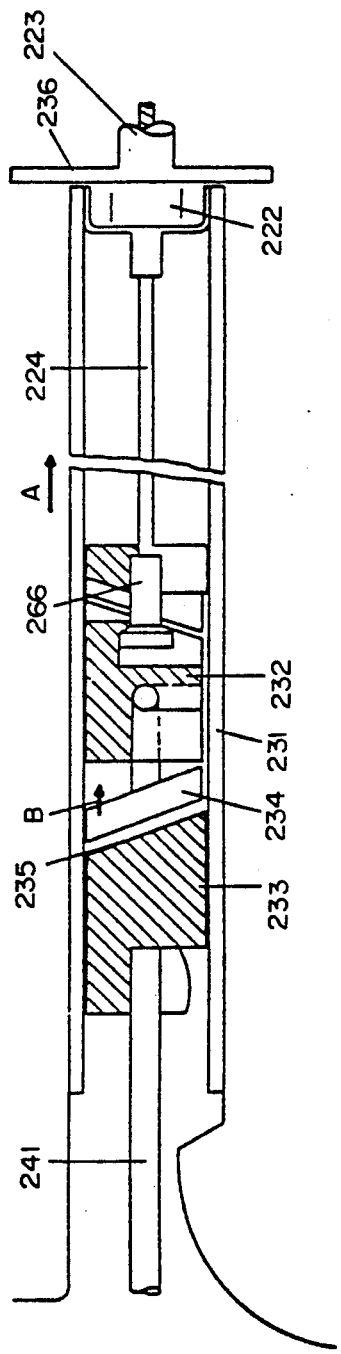

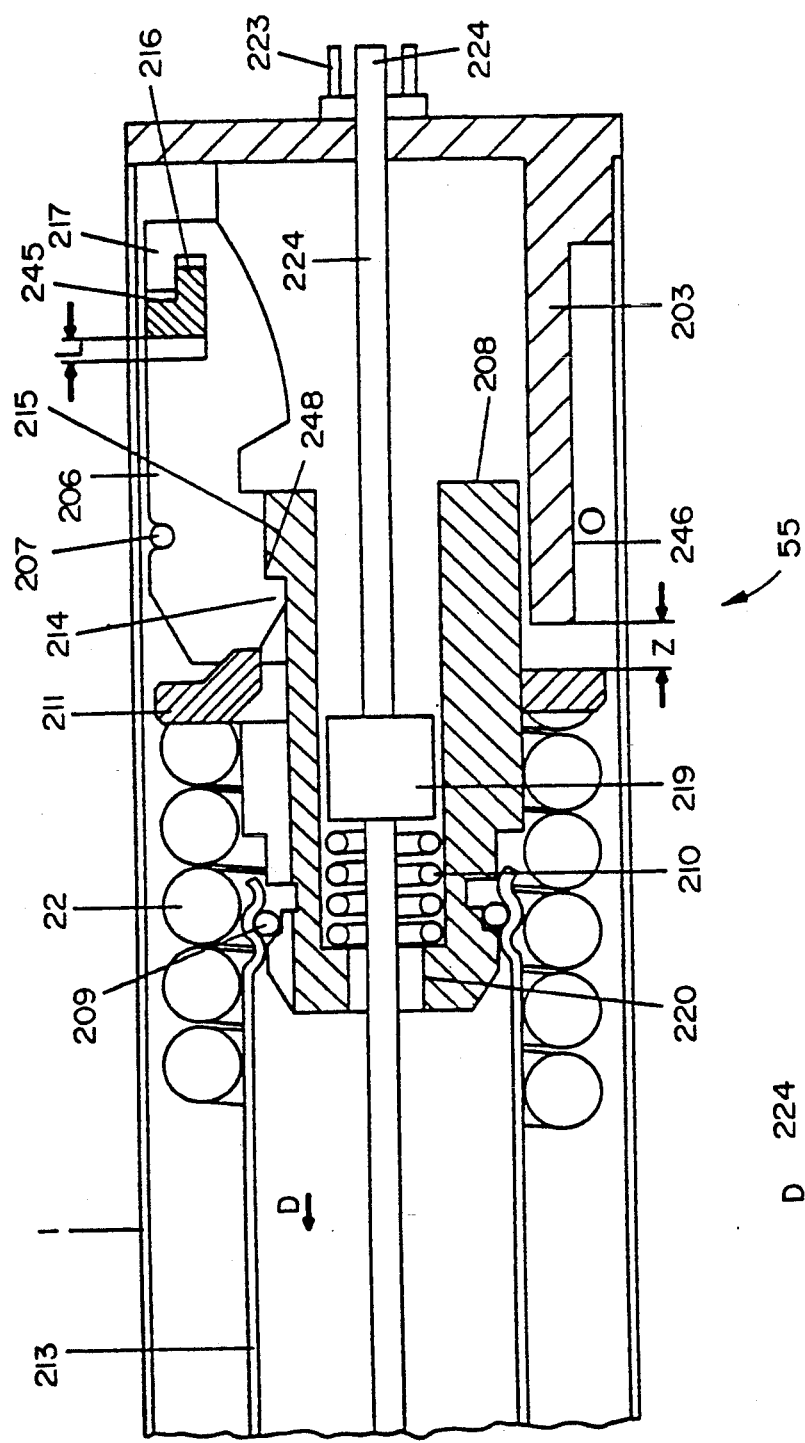
FIG. 9
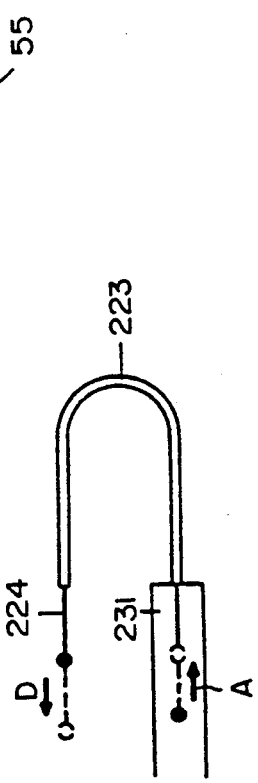
FIG. 9A
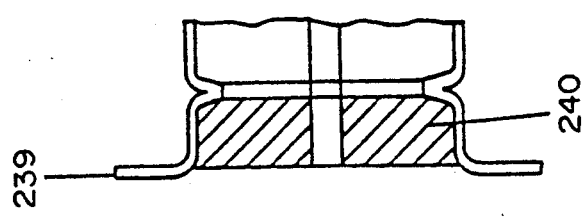

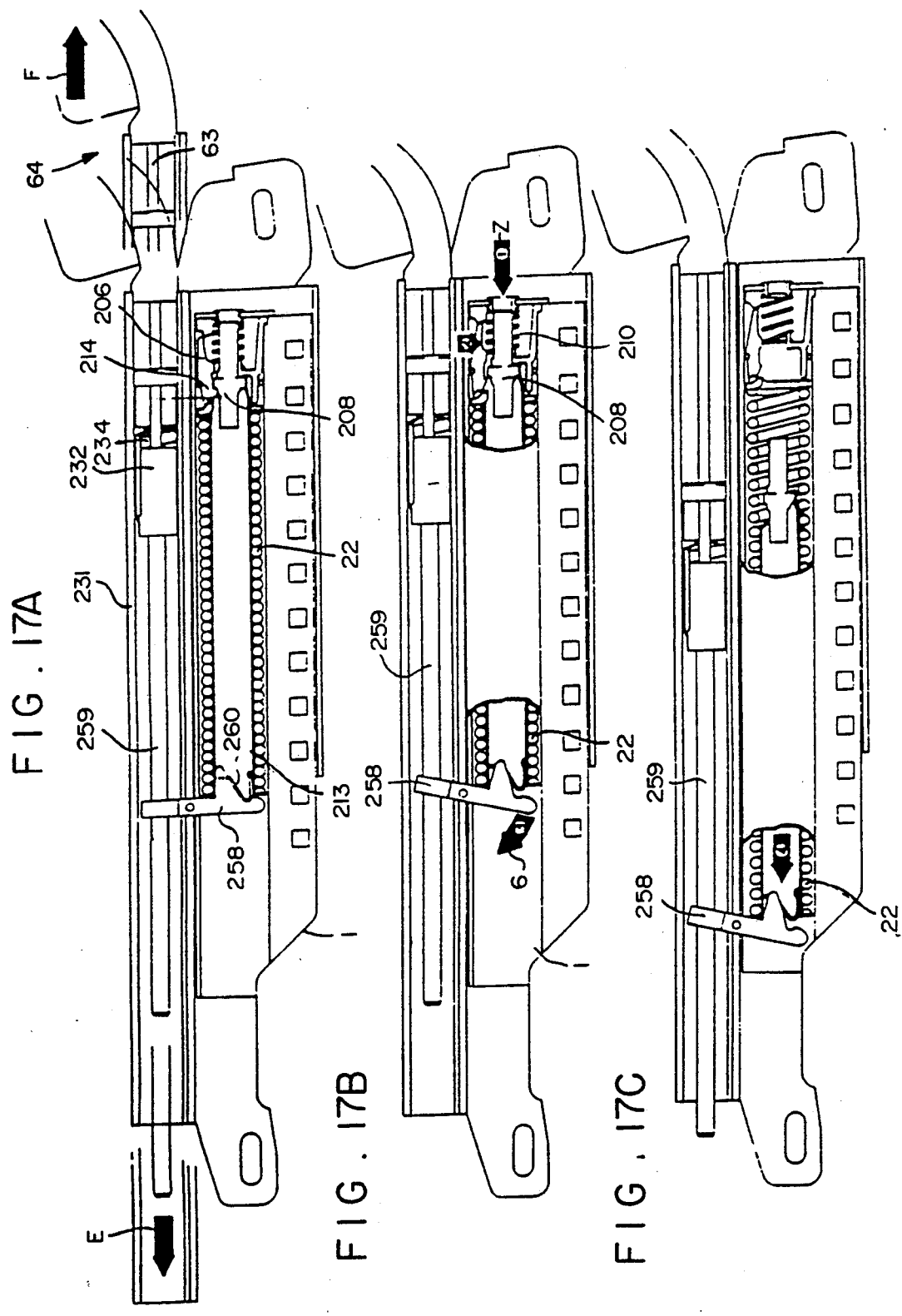

LOCKING DEVICE AND VEHICLE SAFETY BELT TIGHTENING APPARATUS

BACKGROUND OF THE INVENTION

The invention generally concerns a locking device and an apparatus for tightening a safety belt in a vehicle such as a motor vehicle, for eliminating slack in the safety belt when fitted to the body of an occupant of the vehicle, which apparatus uses the locking device.

Such a locking device can be used for securing at least two components which are movable relative to each other under the effect of a force acting thereon, in a locked position which corresponds to a rest position. Such a locking device is provided with a release mechanism by which the two components can be released from the locked position thereof. Typically such a locking device may be used in an apparatus for tightening a safety belt in a vehicle. More specifically, such an apparatus is designed to cause a safety belt to be applied in a taut condition around the body of the occupant of a vehicle in response to an extreme variation in speed and in particular in response to an impact loading or crash loading which is caused by the vehicle being involved in an accident. The apparatus thus removes from the belt the slack or looseness which is usually to be found in the belt under normal driving conditions where there is no need for the belt to be tightly fitted to the occupant of the vehicle. It will be appreciated however that the slack in the belt can give rise to the danger that, in the event of an accident involving for example a front impact, the occupant of the vehicle may be thrown forwardly to an excessive degree. The belt tightening apparatus is intended to prevent that from happening.

An arrangement of that kind generally comprises a sensor for detecting the extreme variation in speed of the vehicle in the event of an accident, and a locking device with which a locked force storage means is released to produce the belt tightening movement component which is effective to remove slack from the belt. It will be seen therefore that there is a transmission means between the sensor and the locking device. The force storage means is initially in a stressed and locked condition, and it is released from that condition in response to a suitable actuating message transmitted thereto from the sensor, by way of the transmission path. Electrical and/or magnetic transmission means and mechanical transmission means may be used to provide that transmission path. That however means that a certain time inevitably elapses between the response of the sensor, and release of the force storage means. Furthermore additional components are required in order to put the force storage means into the unlocked condition so that the belt tightening movement can be appropriately transmitted to the safety belt to remove slack therefrom.

SUMMARY OF THE INVENTION

An object of the present invention is to provide a locking device for securing at least first and second mutually relatively movable members in a locked position, which is also capable of performing a sensor function for detecting an external overload such as excessive acceleration applied thereto, which is then effective to release the locking device so that the first and second members are capable of movement relative to each other.

Another object of the present invention is to provide an apparatus for tightening a safety belt in a vehicle, which requires only a reduced number of components for proper operation of the apparatus and which is so designed that response of a sensor means for sensing a loading acts directly on the apparatus to produce a tightening effect thereby.

Still another object of the present invention is to provide an apparatus for tightening a safety belt in a vehicle, which includes a locking device capable of very speedy release to cause secure tightening of the safety belt about a vehicle occupant.

In accordance with the teachings of the present invention these and other objects are achieved by a locking device constituting a first aspect of the present invention and an apparatus for tightening a safety belt in a vehicle, which incorporates such a locking device, in a second aspect of the invention.

In the first aspect therefore the invention provides a locking device in which a sensor function is integrated into the locking device. A locking device of that design configuration can preferably be used in safety systems such as steering column collapse systems, safety belt systems and any situation in which locking means must be released due to an external overloading acting on an assembly. The locking device is preferably used in a motor vehicle safety belt tightening apparatus.

In the second aspect of the invention, the belt tightening apparatus can provide a compact arrangement of sensor means and force storage means formed by a compression spring which also forms an inertia weight which, in the event of an extreme variation in vehicle speed, for example in the event of a crash loading, is guided movably in a housing connected to the vehicle, thereby to release the locking action. Furthermore, the dual function performed by the compression spring provides for direct transmission of the sensor function to the locking means and thus causes the force storage means which is formed by the stressed compression spring to be freed in response to the sensor action, in the minimum possible period of time. As a result the occupant of a vehicle, who is involved in the accident, becomes involved in the deceleration of the vehicle as a result of the accident, at an early time in the deceleration phenomenon, so that the severity of the accident is effectively reduced as a result, from the point of view of the vehicle occupant. The belt tightening apparatus is preferably connected to the safety belt lock, and the apparatus may be capable of taking up an amount of slack in the belt of up to 180 mm. When using a structure in accordance with the invention, a three-point belt arrangement involving shoulder and lap belts is tightened in a very short period of time at the beginning of a crash by virtue of the tightening movement of the safety belt lock so that the vehicle occupant is effectively prevented from being thrown about within the vehicle, at the time of the accident.

In an advantageous feature, as will be described in greater detail hereinafter, the sensor means and the force storage means of the arrangement according to the invention together with a return motion locking means may be disposed in a compact construction in a housing of a simple configuration, preferably a tubular housing. The tubular housing may be easily secured to the vehicle seat, in particular the anchor rail which is movable with the seat, at the inward side of the seat, that is to say towards a central transmission tunnel of the vehicle. In that case the housing may be disposed in the squab portion of the seat. That provides for a readily attainable arrangement of the belt tightening apparatus according to the invention which operates in a purely mechanical fashion.

Furthermore, the arrangement may include on the outside of the housing a cable direction-changing device such as cable direction-changing plates which can provide that a belt tightening cable can be passed in a simple manner from the actual belt tightening apparatus to the safety belt lock without any alteration on the seat, for practically any type of vehicle, thereby to make it easier for the apparatus to be integrated into a seat.

More particularly, in a preferred feature when using a tubular housing as mentioned above, the compression spring of the apparatus is in the form of a compression coil spring which preferably extends in the direction of travel of the vehicle. The locking device in which the sensor or a part of the sensor is preferably integrated is also disposed adjoining the spring in the longitudinal direction of the assembly, so that the longitudinal movement of the compression spring, in a crash situation, is fully transmitted to the sensor assembly.

In an advantageous construction according to the invention, the locking device is installed between a tension cable and the stressed compression spring, with the locking device moving with the compression spring in a crash situation. In addition, as already mentioned above, integrated into the locking arrangement is a sensor member which co-operates with a second sensor member which is disposed at a stationary position in the housing. For that purpose, in the rest position of the structure, the first and second sensor portions bear against each other while in the event of a movement of the compression spring and the locking device, which is triggered off in a crash situation, the two sensor portions move away from each other, thereby also causing the locking action to be released. The compression spring may advantageously apply an unlocking or release force to the locking arrangement.

The resulting interactions between the compression spring, the sensor arrangement and the locking device, take place over a very short distance and therefore in the minimum possible times so that the belt tightening movement which acts on the tension cable to tighten the belt is initiated very quickly.

In another preferred feature, the above-mentioned tension cable is secured by a return movement lock device which has a locking action on the cable, in a direction of movement which is opposite to the direction of belt tightening movement. That return or reverse movement lock device may comprise a tube which is arranged in a coaxial relationship in the tubular housing, while a retaining elliptical member which is connected to the tension cable is guided in the tube in a clamping-free manner in a defined angular position, in the rest condition and in the belt tightening direction, thereby to provide a compact structure. The retaining elliptical member can then be moved into a clamping retaining position by tilting, to resist movement in the opposite direction. That construction thus provides an arrangement which prevents return or reverse movement of the tension cable. Advantageously, the compression spring which is desirably a coil spring may be disposed in the space between the tubular housing and the tube which is disposed in the interior of the housing; that tube may be referred to as the braking tube. The belt tightening apparatus is of the desired compact design configuration by virtue of the compression spring which performs a dual function as a force storage means and an inertia weight, and the reverse movement lock device, being disposed in coaxial relationship, so that they can be disposed in a simple tubular housing.

The retaining elliptical member may advantageously be of a plate-like configuration and may be guided between first and second thickened portions which are connected to the tension cable. The one thickened portion which may be for example in the form of a lock pin associated with the locking device may have a guide surface which is inclined with respect to the axis of the housing. The inclined guide surface guides the retaining elliptical member in a defined inclined position in the braking tube, so as not to produce any clamping effect thereby, when the arrangement is in the rest condition and when the assembly is displaced in the direction for tightening of the safety belt. The other thickened portion may advantageously be formed by a pressed portion of the cable. If, after a belt tightening movement of the assembly, the tension cable is subjected to a tensile force directed in the opposite direction to the belt tightening movement, as a result of a crash situation, the retaining elliptical member is then tilted into a clamping retaining position. That may advantageously occur due to the thickened portion in the form of the pressed portion of the cable.

That construction therefore provides an infinitely variable or stepless reverse motion locking action in relation to the belt tightening tension cable, while the retaining elliptical member is tilted into the clamping retaining position thereof, with a virtually instantaneous response.

In accordance with another design configuration according to the invention, the sensor and the compression spring which forms an inertia weight for the sensor may be disposed in a first housing which is fixed in a stationary position to the vehicle, and the reverse movement lock device may be disposed in a second housing which is displaceable with the vehicle seat with which iit is associated. That arrangement ensures that the compression spring which forms the inertia weight for the sensor arrangement, upon displacement of the vehicle seat in the longitudinal direction of the vehicle or in the event of adjustment of the height of the seat, is not subjected to any pulse which can result in the sensor arrangement being accidentally brought into operation. As mentioned, the sensor means and the compressoon spring are disposed in a first housing at a stationary position on the vehicle, while the reverse movement lock device for preventing reverse movement of the tension cable is arranged separately therefrom in a second housing adjustably with the vehicle seat. In that respect the first and second housings may be arranged for example one above the other in such a way that the housing which contains the sensor means and the inertia weight is fixedlyy connected for example to a stationary component connected to the vehicle of the floor, for example the lower mounting rail of the vehicle seat, while the second housing which carries the reverse movement lock device may be connected to the upper mounting rail of the vehicle seat which is movable with the remainder of the vehicle seat structure. In one housing, the sensor means and then, upon release of the compression spring, the reverse movement thereof, act on the tension cable, while in the other housing, after the belt tightening movement, the reverse movement lock device acts on the cable.

In a preferred arrangement however it is also possible, in particular when the two preferably tubular housings are not arranged with their axes in alignment with each other, for the belt tightening movement which is triggered by the compression spring upon release thereof to be transmitted to the tension cable by way of a bowden cable assembly.

For that purpose the bowden cable sheath or casing may be guided movably on the first housing in the direction of the belt tightening movement produced by the compression spring, while one end of the bowden cable itself is fixedly connected to the first housing and the second end of the bowden cable is connected to the tension cable. In that arrangement the movement of the bowden cable sheat or casing relative to the first housing in the belt tightening movement of the compression spring is transmitted to the end of the bowden cable which is connected to the tension cable, thereby providing the desired safety belt tightening movement.

In another preferred feature of the invention, the belt tightening movement produced by the compression spring upon release thereof is transmitted to one end of the bowden cable, and the other end of the bowden cable is connected to the tension cable, thereby also providing the desired safety belt tightening movement.

In the constructions in which the belt tightening movement is transmitted to the tension cable by way of the bowden cable assembly, the compression spring which serves both as an inertia weight for the sensor arrangement and also as a force storage means for producing the belt tightening movement may be supported with its one end against the above-mentioned locking pin member and with its other end against a member which is connected to the bowden cable wire. That ensures that the locking pin member is maintained in a defined position in the first housing so that particularly in a crash situation, the first and second sensor portions can move away from each other so that the locking element of the arrangement can be pivoted out of its locking position under the effect of the force of the compression spring.

The reverse motioon lock device provided in the second housing preferably acts on the tension cable. If the belt tightening movement is transmitted by way of a bowden cable assembly, then in that second housing the tension cable may preferably be connected to the bowden cable wire by way of a cablle connecting member which is axially guided in the second housing. As mentioned above, the reverse motion lock device may preferably be in the form of an elliptical retaining member which, in a rest condition and for a belt tightening movement, is guided in a defined inclined position in the second housing which forms the above-mentioned braking tube, so that the retaining member does not have any clamping effect, whereas the retaining member can be moved into a clamping retaining position by a tilting motion, to prevent movement in the opposite direction. That tilting movement into the clamping retaining position may be further assisted by means of an auxiliary spring.

So that the safety belt lock can also be displaced upon adjustment of the height of the vehicle seat, it is sufficient for the end of the second housing from which the tension cable goes to the safety belt, in particular to the hip attachment point thereof, also to perform a pivotal movement when the height of the vehicle seat is adjusted. The other end of the second housing can then be connected displaceably to the adjustable part of the vehicle seat, in particular the upper mounting rail forming part of the support structure of the movable part of the seat.

So that the hip point at which the lap strap and the shoulder strap of the safety belt system come together when the safety belt is in the condition of being locked with the belt lock, always occupies the same position, it is desirable for the belt lock to be adapted to be displaceable together with the vehicle seat. In order for the belt tightening movement component to be transmitted from the belt tightening apparatus by way of the tension cable which goes to the belt lock, without involving serious problems, a further preferred configuration according to the invention provides that the belt lock and the tension cable directly connected thereto are guided movably in a belt tightening movement shaft, over a shaft guide path provided therein. The belt tightening shaft is connected to a cable direction-changing means which, together with the belt tightening device, is secured to a seat structural member which is displaceablle with the seat upon adjustment thereof. The cable direction-changing arrangement is arranged to carry and transmit to the seat structural member restraining forces which are produced by the safety belt and transmitted to the tension cable by way of the safety belt lock.

Preferably the cable direction-changing arrangement is in the form of a sheet metal structure, the shape of which is adapted according to the requirements involved.

That configuration provides a compact construction with a small number of simple structural elements, which ensures that the belt tightening apparatus can be easily integrated into the seat structure. In addition, that arrangement also provides that the cable direction-changing arrangement ensures that the restraininig forces of the safety belt are carried in such a way as to be crash-proof, and those forces can be adequately transmitted to the adjustable sub-structure of the seat assebly. That arrangement also provides that a reverse movement lock device which is included in the preferably mechanical belt tightening assembly is also relieved of load. The purpose of the reverse movement lock device is, as indicated above, to ensure that the tension cable, after having been operative to tighten the belt, is blocked in the opposite direction of movement to the direction for tightening the belt. In particular, as already mentioned, the belt tightening apparatus and more specifically the reverse movement lock device thereof may be mounted on an adjustable mounting rail of the seat structure, preferably on the inner rail which is towards a central transmission tunnel. That integrated installation of the belt tightening apparatus means that no alterations have to be made to the seat. On the contrary the belt tightening apparatus may be used for all existing types of vehicle. The configuration of the belt tightening apparatus means that the belt tightening mechanism, the means guiding the tension cable outside the belt tightening mechanism and the means for guiding the belt lock in the belt tightening movement of the structure form a structural unit which cann be wholly secured to the adjustable part of the vehicle seat.

The above-mentioned belt tightening shaft in which the tension cable and the belt lock directly connected thereto are guided can be of a generally rigid configuration or it may be collapsible or telescopic in the direction of the belt tightening movement.

The cable guide path is advantageously open towards one side so that in that way the tension cable is able to deflect within the direction-changing arrangement provided therefor, if for example a pressure is applied to the head portion of the reverse movement lock device and the tension cable is moved in the belt tightening direction, in particular when the belt tightening shaft construction is of a kind which is collapsible in a bellows-like fashion. Because of the stiffness of the tension cable, that movement could be transmitted into the belt tighteniing mechanism and to the sensor arrangement thereof, so that the sensor arrangement can be caused to be incorrectly actuated as a result. However because the cable guide construction is open in the opposite direction to the direction in which the forces carried by the cable guide structure act, the part of the tension cable which is disposed in the cable guide structure can deflect so that the movement of the portion of cable in the belt tightening shaft, which occurs when a pressure is applied to the head poriton of the shaft, is not transmitted into the belt tightening mechanism but is merely absorbed by virtue of the deflection of the tension cable.

Further objects, features and advantages of the present invention will be apparent from the following description of preferred embodiments thereof.

BRIEF DESCRIPTION OF THE DRAWINGS

FIG. 8 is a partly sectional side view of the FIG. 7 structure, in the assembled condition, FIGS. 8A and 8B are a diagrammatic view of the mode of operation of the embodiment shown in FIGS. 7 and 8, FIG. 9 is a side view of a fifth embodiment of the device according to the invention, in the assembled condition, showing a first housing with the sensing means and the compression spring thereof, FIG. 9A is a diagrammatic view of the mode of operation of the FIG. 9 construction, FIGS. 17A-C show a sixth embodiment illustrating a safety belt tightening apparatus according to the invention.

DESCRIPTION OF PREFERRED EMBODIMENTS

Figure 16A:
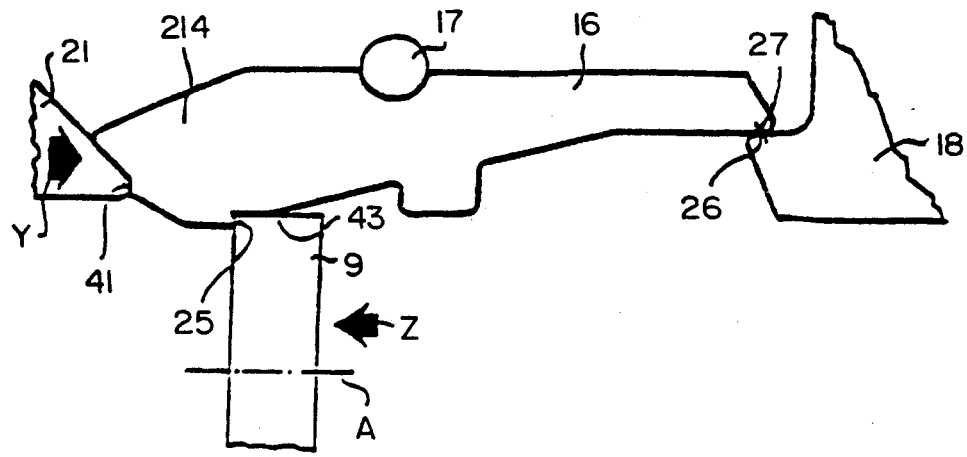
FIGS. 16A-C show an embodiment of a locking device which can be used in a safety belt tightening apparatus according to the invention.
Figure 16B:
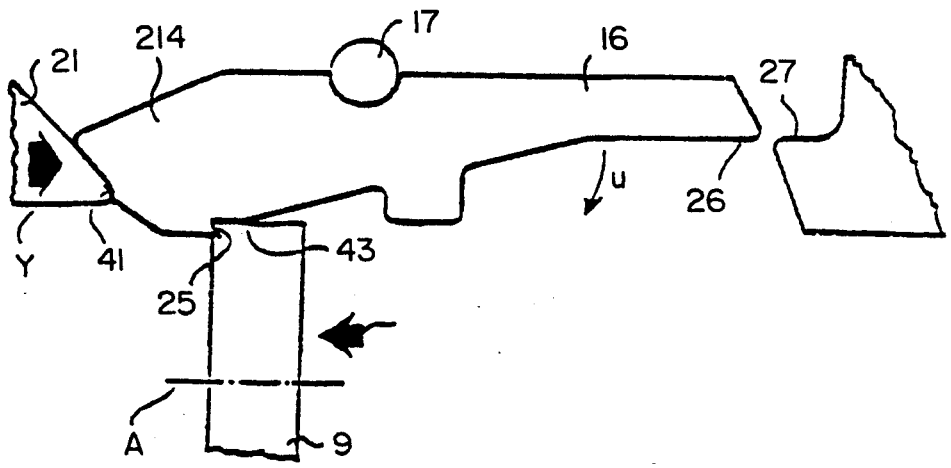
Figure 16C:
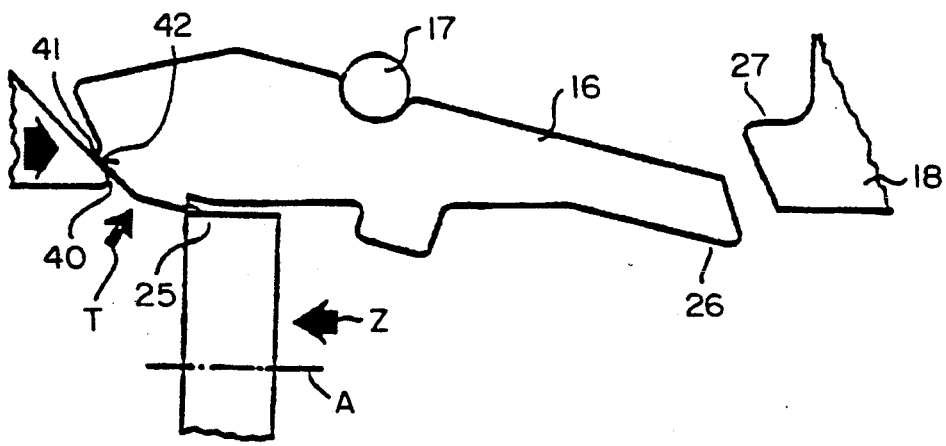

Before going on to describe in detail various embodiments of a safety belt locking apparatuss for use for example in a motor vehicle, for example for eliminating slack from a fitted safety belt, reference will first be made to FIGS. 16A through 16C illustrating an embodiment of a locking device, in accordance with an aspect of the present invention, which can be advantageously used in a safety belt tightening apparatus which is also in accordance with the invention.

Looking therefore now at FIGS. 16A through C, diagrammatically illustrated therein are various operating conditions of an embodiment of a locking device according to the invention, comprising a locking element 214 which produces its effect between first and second mutually relatively movable members 9 and 21 which are to be locked under some operating conditions. The two members 19 and 21 to be locked together are displaceable relative to each other for example in the directions indicated by the oppositely directed arrows Y and Z shown in FIG. 16A. In the condition shown in FIG. 16A, the two movable members 9 and 21 and also the locking element 214 are in their respective rest positions.

The locking element 214 has at least first and second support locations 25 and 41 against which the two movable members 9 and 21 bear against the locking element. As can be seen in particular form FIG. 16C, the support locations 25 and 41 are surface portions on the locking element 214, which are directed in mutually opposite relationship and substantially perpendicularly to the directions of movement indicated by the arrows Y and Z, in particular in relation to the direction indicated by the arrow Z. The two movable members 9 and 21 are pressed against the support locations 25 and 24 in the rest position of the assembly as shown in FIG. 16A. The pressure force which acts in the directions indicated by the arrows Y and Z is produced by a compression spring which is indicated at 22 for example in FIGS. 1 through 9 and the action of which will be described hereinafter with reference to the embodiments of belt tightening apparatuses which will be described hereinafter in this description. However the pressing force with which the first and second members 9 and 21 are pressed against the support locations 25 and 41 of the locking element 214 may originate from a force-producing means of a different nature.

The embodiment of the locking device illustrated in FIGS. 16A through 16C also has a stop means comprising a stop surface indicated at 27 which is formed on a fixedly installed structural member 18. Formed on the locking element 214 is a lock lever 16 having a stop surface 26 which bears against the stop surface 27 in the rest condition of the assembly, as shown in FIG. 16A.

The first and second support locations 25 and 41 on the locking element 214 are arranged in displaced relationship with each other so that the pressure forces applied to the locking element 214 in the directions indicated by the arrows Y and Z cause a torque to be produced, about a pivot axis indicated at 43 in FIGS. 16A and 16B. The pivot axis 43 is formed by a location on the locking element 214, at which it bears against one of the members 9 to be locked.

The arrangement also includes a spring 17 which further assists with the torque acting on the locking element 214. That torque which acts in an unlocking or release direction, as will be described hereinafter, and which therefore can also be referred to as an unlocking or release moment, produces a pressing force with which the two stop surfaces 26 and 27 are caused to bear against each other.

When the locking device illustrated in FIG. 16A is subjected to the effect of an external force which in the illustrated construction is applied by way of the movable member 9, the two movable members 9 and 21 and the locking element 214 with the lock lever 16 formed thereon represent a motion unit which is moved in its entirety in the direction indicated by the arrow Z and thus moves away from the stationary structural member 18. As a result the stop surfaces 26 and 27 are moved away from each other so that the lock lever 16 is moved away from the stop means formed by the surface 27 and the stationary structural member 18.

In that operating position of the assembly, as shown in FIG. 16B, the unlocking or release moment which was discussed above in greater detail takes effect so that the locking element 214 and the lock lever 16 are pivoted about the pivot axis 43 in the clockwise direction in FIG. 16B, as indicated by the arrow U.

In that situation the locking element 214 and the lock lever 16 thereon are moved into the position shown in FIG. 16C. When that happens, the support location 41 comes out of engagement with the member 21, in particular a support surface 40 thereon, so that the member 21 can move in the direction indicated by the arrow Y. In that situationm, the locking element 214 is displaced along an inclined surface 42 on the member 21 so that the other movable member 9 comes out of engagement with the support location 25. Arrow T in FIG. 16C clearly indicates the motion component which is performed by the locking element 214 in that situation.

The member 9 is then released so that it can move freely in the direction indicated by the arrow Z. In that way, when a force storage means such as a spring arrangement is connected to the member 9, the arrangement can produce a motion component which, when the locking device was in the rest position shown in FIG. 16A, was prevented or blocked. That motion component can then be transmitted to other structural members in the appropriately desired fashion.

The locking device shown in FIGS. 16A through 16C may be arranged in a multiple array about an axis as indicated at A. In that case the locking devices are preferably at equal angular spacings from each other. The spring 17 is then of an annular configuration and it then also performs the function of a holding device by means of which, when the arrangement is in the rest postion shown in FIG. 16A, the individual components of the locking device and in particular the locking elements 214 are held in their operative position on the member 9 to be locked. Under those circumstances, the locking elements 214 are supported on the member 9 to be locked in position, at support locations which form the respective pivot axes indicated at 43. As already mentioned, in that case the annular spring 17 is also operative to assist in producing the above-mentioned unlocking or release moment which is operative in the clockwise direction in FIGS.. 16A through 16C, about the respective pivot axis 43.

When a force acts on the member 9 from the outside of the illustrated arrangement, that may be a force which is caused for example by an excessive level of acceleration. It will be apparent from the following description that integrated into the illustrated locking device is a sensor function which is provided by virtue of the two stop surfaces 26 and 27. The response characteristic of that sensor arrangement is determined by the distance covered by the motion unit comprising the members 19 and 21 and the locking element 214 with its lock lever 16, in order for the two stop surfaces 26 and 27 to come out of engagement, and also by the pressing force which is produced by the unlockign or release moment and with which the two stop surfaces 26 and 27 are pressed against each other in the rest condition of the arrangement.

The arrangement may also include a spring which acts on the member 9 and which also contributes to determining the response characteristic of the sensor arrangement.

Accordingly, as indicated above, the locking device according to the invention includes an integrated sensor function. The locking device according to the invention can be used in regard to the production of adjusting movements which are initially locked but which are to come into effect when a force acting on an assembly exceeds a given threshold value. For example the above-described and illustrated locking device may be used in regard to reducing the length of a steering column in a motor vehicle, for example in the event of a head-on impact thereof. The locking device of the invention may also be used in connection with producing a safety belt tightening movement component which is effective to remove slack from a motor vehicle safety belt. In that connection, reference will be made hereinafter to various different embodiments of apparatuses for tightening a safety belt and in particular belt tightening devices which are suitable for use in such apparatuses.

Figure 1:
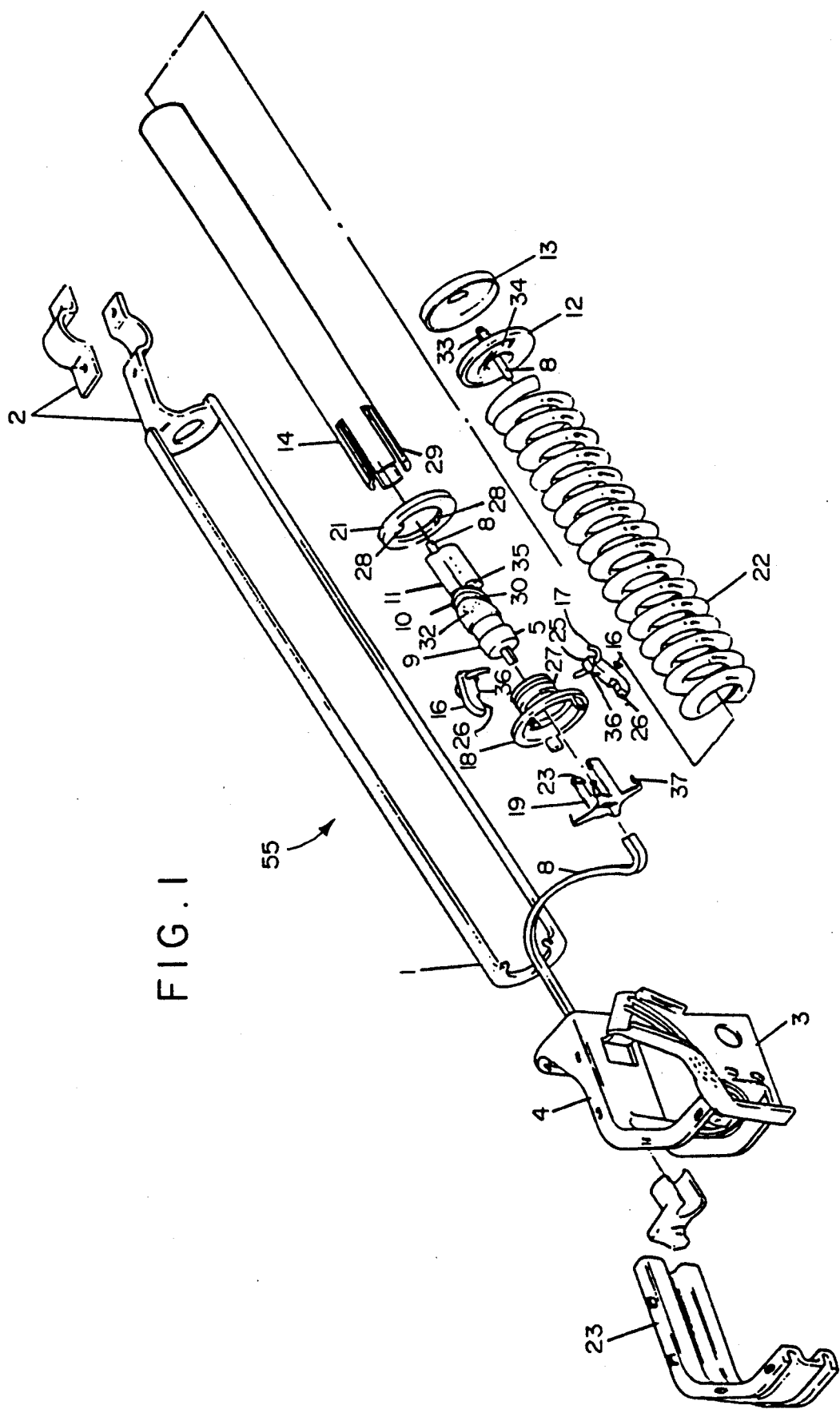
FIG. 1 is an exploded perspective view showing the individual components of a first embodiment of a safety belt tightening apparatus according to the present invention.

The belt tightening apparatuses which are described and illustrated herein as embodiments of structures according to the teachings of the present invention, for a safety belt of a motor vehicle, include a belt tightening device as indicated at 55 for example in FIG. 1, in the form of a mechanical structure. In the event of an extreme variation in vehicle speed, such as substantial deceleration or acceleration or in a crash situation, the arrangement 55 produces a belt tightening movement component which is transmitted by way of a tension cable indicated at 63 in FIG. 12 to a belt lock illustrated at 61 in FIG. 13. The belt lock 61 is directly connected to the tension cable 63.

Figure 12:
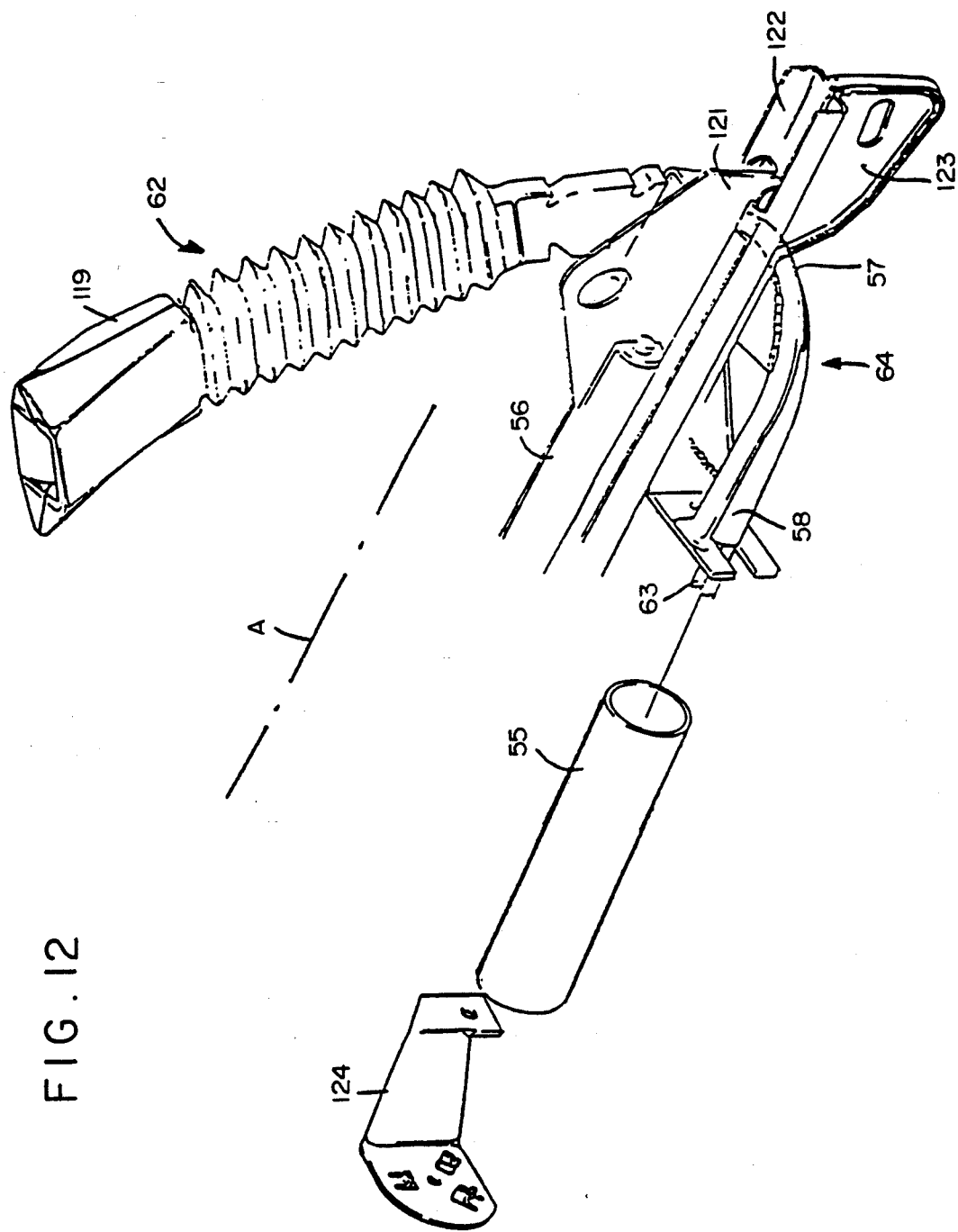
FIG. 12 is an exploded view of a first embodiment of a tension cable direction-changiing arrangement which is used in the construction according to the invention.
Figure 13:
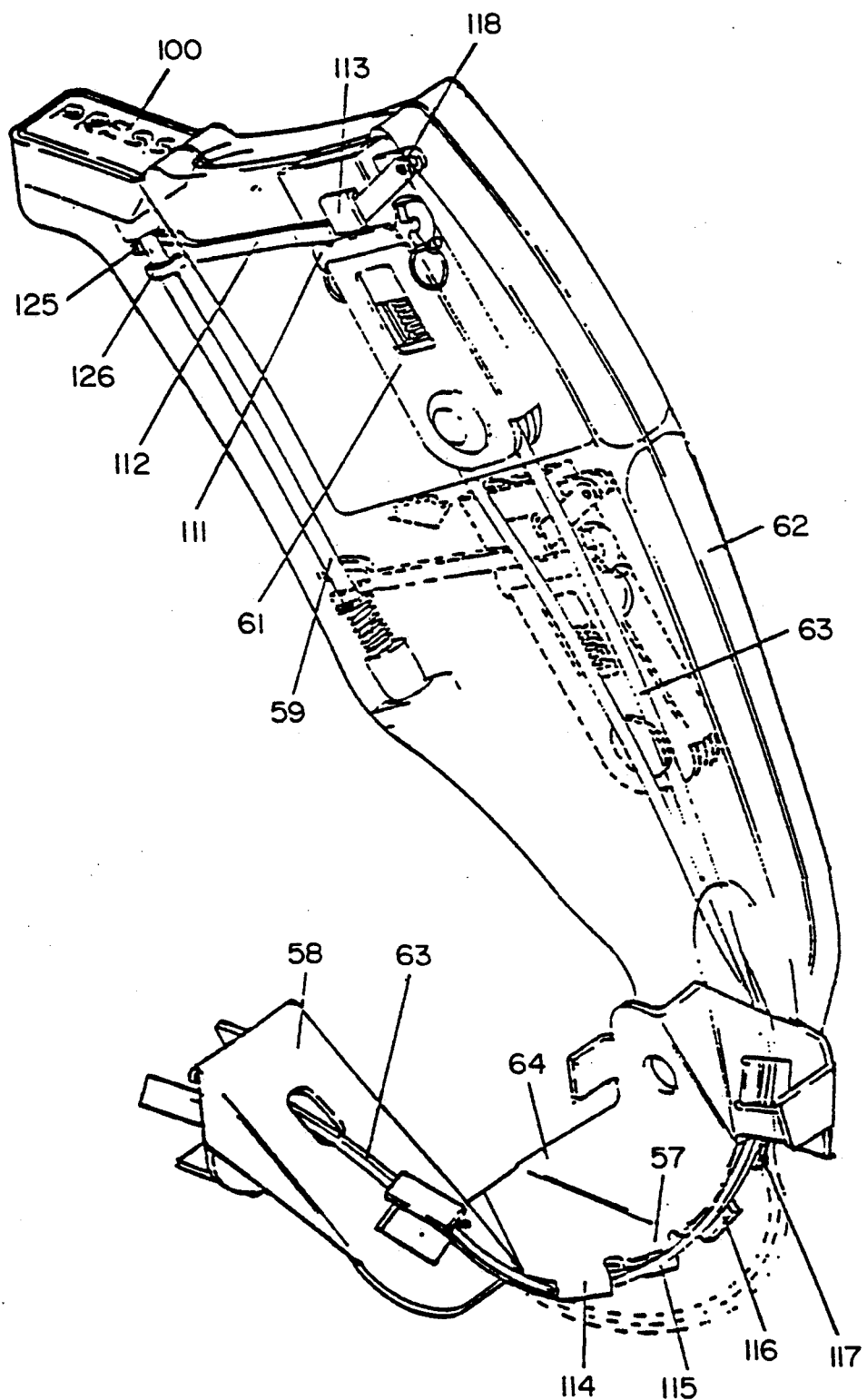
FIG. 13 shows a second embodiment of the tension cable direction-changing arrangement used in the device according to the invention.

In the construction illustrated in FIGS. 12 and 13 for example, the belt lock 61 and the part of the cable 63 connected thereto are guided movably in a belt tightening shaft 62 along a guide path therein. Provided between the unit 55 and the shaft 62 is a cable direction-changing or guide arrangement 64 which preferably comprises a metal plate structure and is in the form of a direction-changing or guide plate. Provided in the cable direction-changing unit 64 for the cable 63 is a cable guide path as indicated at 57 in FIGS. 12 and 13, as will be described in greater detail hereinafter. Various preferred embodiments of the unit 55 will now be described.

Figure 2:
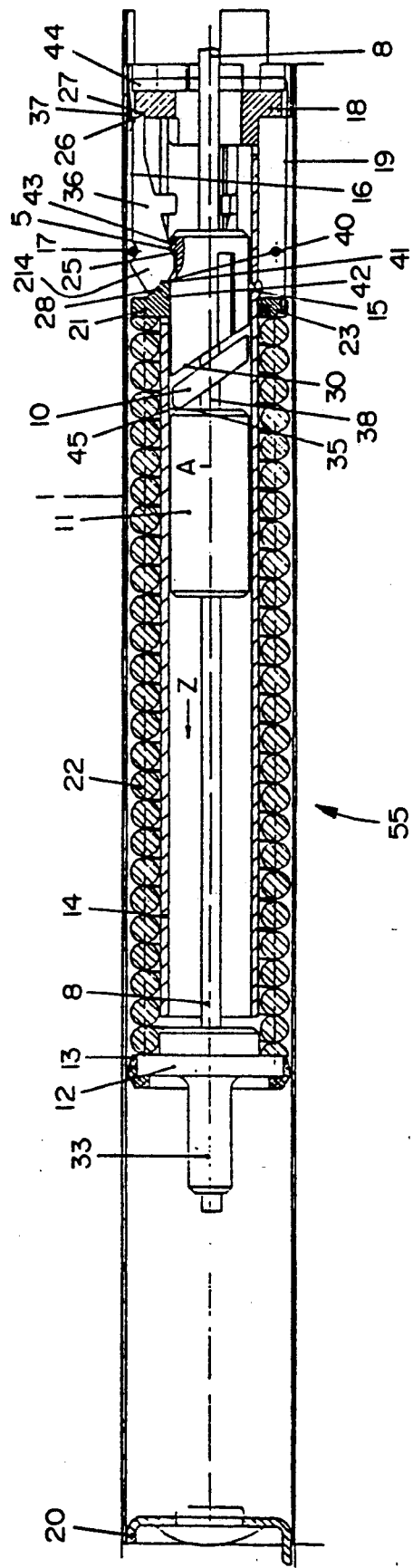
FIG. 2 is a sectional view of the FIG. 1 embodiment in the assembled condition.

Referring therefore to FIGS. 1 and 2, the embodiment of a mechanical belt tightening unit according to the invention as illustrated therein for safety belt locks comprises a tubular housing 1 representing a protective housing which accommodates a compression spring 22 which in the illustrated embodiment is in the form of a coil spring. The compression spring 22 is held in a prestressed condition between two spring plates 12 and 21 and thus forms a force storage means for a belt tightening movement for eliminating slack from the associated safety belt. The belt tightening movement is transmitted to a tension cable 8 to which the compression spring 22 is connected at one end thereof. For that purpose the spring plate 12 is provided with an outwardly disposed squeeze nipple connection 33 to which the cable 8 is connected by the nipple being pressed thereon, after the compression spring 22 has been prestressed in an appropriate fashion. The spring plate 12 is surrounded by a sliding ring 13 in order for it to be satisfactorily guided in its movement in the tubular housing 1. The end of the compression spring 22 is accommodated in a positive and non-rotatable fashion in the spring plate 12, in a pressed spriral groove or recess 34 therein.

Arranged within the compression spring 22 is a further tube, referred to herein as a braking tube 14. The braking tube 14 and the compression spring 22 are arranged in mutually concentric relationship around the common axis of the tubular housing 1, thus providing a compact structure.

Figure 3:
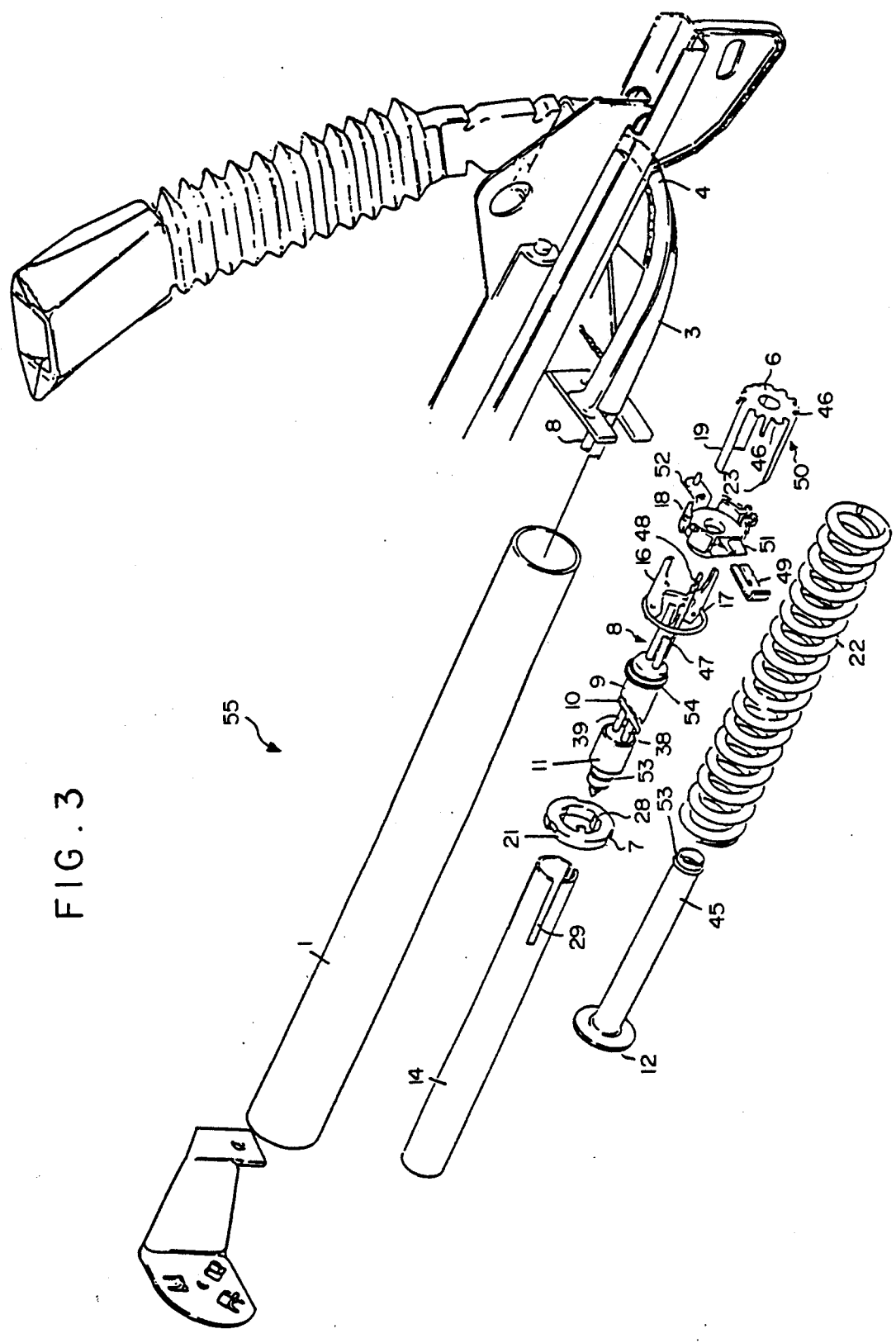
FIG. 3 is an exploded perspective view of the individual components of a second embodiment of the apparatus according to the invention.

Disposed within the braking tube 14 is an arrangement forming a device for preventing a return or reverse movement, referred to herein as a reverse movement lock device. The reverse movement lock device includes an elliptical retaining member 10 which is of a disc-like configuration and which has first and second elliptical holes 32 passing therethrough. The member 10 is arranged by means of the holes 32 on a double tension cable portion with parallel cable strand portions as indicated at 38 and 39 in FIG. 3. In the illustrated embodiment the member 10 is disposed between two piston-like enlargement portions which are connected to the tension cable 8, comprising a lock pin 9 and a cable pressing member 11. The two cable strand portions 38 and 39 are connected by the cable pressing portion 11 to the single tension cable 8 which is passed along the axis of the braking tube 14. The lock pin 9 has a guide surface 30 which is arranged at an inclined angle with respect to the axis A of the housing 1 and by means of which the member 10 is guided in a defined inclined position relative to the axis A in the rest position, that is to say when the compression spring 22 is stressed and locked, and in the belt tightening movement in the direction indicated by the arrow Z in FIG. 2. That arrangement thus provides for a guiding action without a clamping effect within the braking tube 14 in the belt tightening movement indicated by the arrow Z in FIG. 2. For that purpose, the member 10 may advantageously be of a cylindrical configuration at its periphery, in order thereby to match it to the inside wall surface of the braking tube 14, as can be clearly seen from FIG. 2. The defined inclined position of the member 10 is further promoted by the two cable strand portions 38 and 39 which are passed through the holes 32 in the member 10. In the illustrated embodiment, the member 10 is rounded off at the edge portion 45 which is towards the member 11, as shown in FIG. 3; as will be described in detail hereinafter, the edge portion 45 of the member 10 can come into contact with the member 11 in order to move the member 10 into a locking position.

At one end, the braking tube 14 is provided with slits 29 (see FIG. 1) and is force-lockingly supported by a support plate 18 which is fixed in one end of the tubular housing 1. The slits 29 serve to ensure that a locking device and a sensor arrangement are disposed in the FIG. 1 assembly, in the proper manner to ensure correct functioning thereof.

In the illustrated embodiment, the locking device is formed by the above-mentioned lock pin 9 and one or more lock levers as indicated at 16 in FIG. 1. The FIG. 1 embodiment has two lock levers 16 while the embodiment in FIG. 3 has three lock levers 16. The lock levers 16 are arranged pivotably in the region of the slits 29 in the braking tube 14. To support the lock levers 16 the spring plate 21 has support projections 28 which extend into the slits 29 in the braking tube 14. The support projections 28 have outwardly facing inclined support surfaces 42 which thus correspond to the above-discussed surfaces indicated at 42 in FIGS. 16A through 16C. The support surfaces 42 in FIG. 1 merge into narrow, radially extending support surface portions 41 which are disposed radially inwardly thereof. Each of the lock levers 16 is supported at one side relative to the one end of the compression spring 22, at the support surface 42 of the above-described configuration. At the other side the support lever 16 is supported against the lock pin 9 which thus corresponds to the movable member 9 shown in FIGS. 16A through 16C. For that purpose the lock pin 9 is provided, in suitable openings therein, with support edges 5 against which the respective lock levers 16 are supported by means of lock surfaces 25. As shown in the embodiment in FIG. 1, instead of a plurality of support edges or shoulders 5 provided in respective openings, the lock pin 9 may be provided with a peripherally extending support shoulder 5. As shown for example in FIG. 1, the support shoulder 5 may be formed in the main body portion of the lock pin 9 or, as shown in FIG. 3, it may be a portion in the form of a steel ring 54 which is pressed on to the main body portion of the lock pin 9, the body portion being in the form of a casting. When the compression spring 22 is in the locked and prestressed condition shown in FIG. 2, which constitutes the rest position of the arrangement, between the surfaces 25 and the support surface 40 with which the lock lever 16 bears against the support projection 28, the lock lever 16 carries the tensile forces which are applied to the arrangement by the compression spring 22 in the pulling direction or belt tightening direction as indicated by the arrow Z in FIG. 2, and the compression forces which are in the opposite direction thereto. Since, as FIG. 2 in particular shows, the support region between the projection 28 and the lock lever 16 is displaced radially outwardly relative to the support shoulders 5 and the lock surfaces 25 which bear against each other, in other words the support shoulders 5 and the lock surfaces 25 are disposed radially further inwardly than the support regions 40–42 between the projection 28 and the lock lever 16, there is a residual torque as the tension and compression forces applied in that region by the compression spring 22 are not carried in that lock lever region in their entirety, but only in respect of about 90% thereof. The residual torque resulting therefrom, corresponding to about 10% of the forces involved, plays a part in regard to the design configuration of the sensor arrangement as will be described in greater detail hereinafter.

Figure 4:
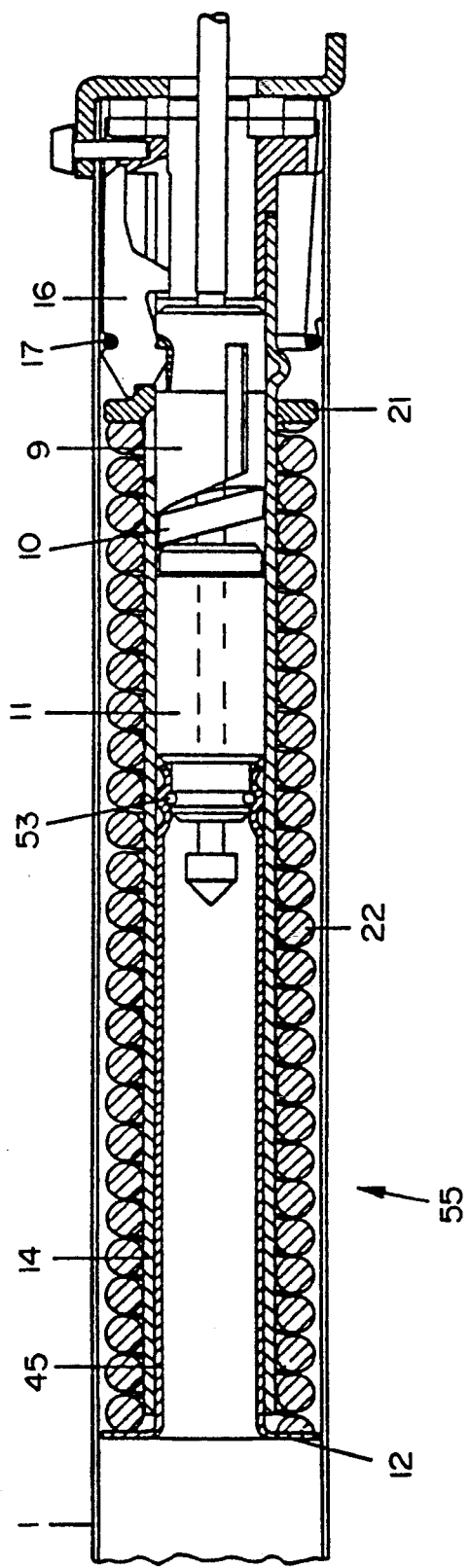
FIG. 4 is a sectional view oof the FIG. 3 construction in the assembled condition.
Figure 5:
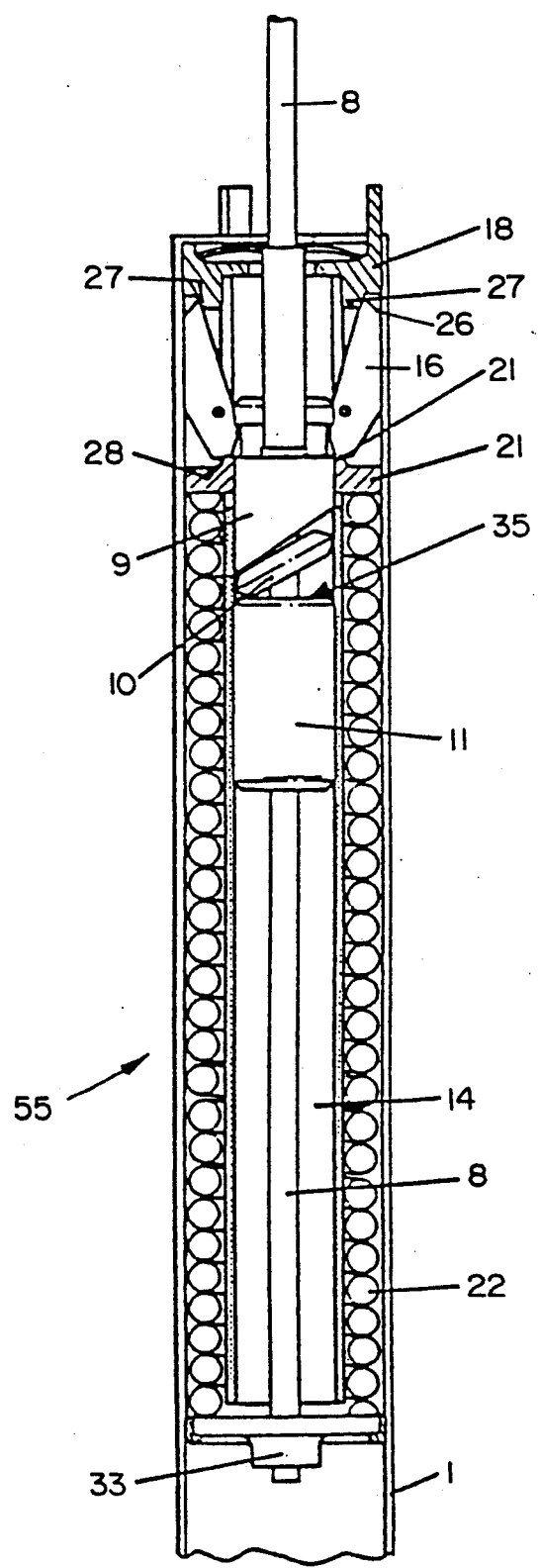
FIG. 5 is a sectional view of a third embodiment of the apparatus according to the invention in the assembled condition.

In the illustrated embodiment, the sensor arrangement is formed on the one hand by a sensor portion 26 which is a part of the lock lever 16, and on the other hand by a sensor portion 27 which is fixed to the housing 1 and which in the illustrated embodiment is part of the support plate 18. The sensor portion 26 on the lock lever 16 is disposed on one lever arm 36 of the lock lever 16 and is in the form of the support surface 26. In the rest condition as shown in FIGS. 2, 4 and 5, the surface 26 bears against a knife-edge contour indicated at 27, which is provided in the form of the second sensor portion on the support plate 18, which is fixed with respect to the housing 1. The surface 26 is pressed against the contour 27 by the above-mentioned residual torque resulting from the fact that the forces of the compression spring 22, in the tension and compression directions, are not compensated in their entirety. In that way an essential part of the sensor arrangement is integrated into the locking mechanism.

In order to provide that the axis for rotary movement of the lock lever 16 is fixed in a defined position in relation to the braking tube 14, the illustrated arrangement has a ring 17 carrying the lock levers 16. The ring 17 is preferably in the form of a round wire ring and may serve as a radial tolerance compensating spring with which the lock levers 16 are radially pressed against mounting pressure locations indicated at 43 in FIG. 2, on the lock pin 9. The mounting pressure locations 43 are disposed radially outwardly of the support shoulders 5 on the outer peripheral surface of the lock pin 9. The lock levers 16 can be pivoted about the mounting pressure locations 43, as will be described in greater detail hereinafter.

Figure 6:
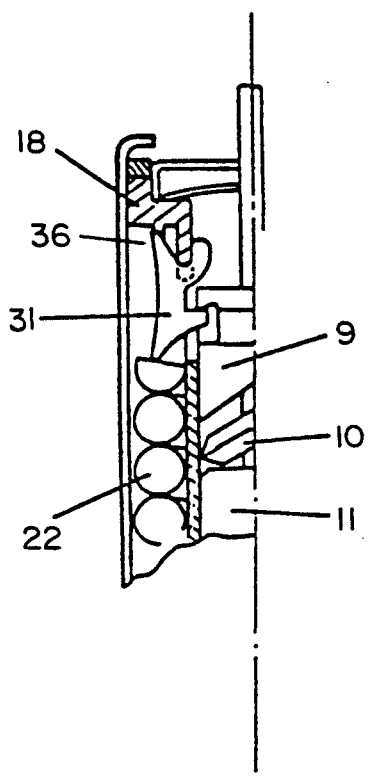
FIG. 6 shows a modified embodiment of a lock lever which can be used in the foregoing embodiments.

Reference may be made at this point to FIG. 6 showing an embodiment of the lock lever in the form of a rotary locking hook 31, involving a design configuration which no longer requires the ring 17 for fixing the axis for rotary movement of the lock lever.

In order to provide a defined rest position for the assembly, that is to say, prestressing of the compression spring 22 in a locked condition, as shown in FIG. 2, the arrangement includes a retaining device as indicated at 50 in FIG. 3. The device 50 comprises return springs 46 formed thereon, and pulling arms 19 with retaining hooks 23 formed thereon. The arms 19 with hooks 23 can also be seen from FIGS. 1 and 2. The springs 46 and arms 19 are connected together by way of a spreader portion indicated at 6 in FIG. 3, which is spread in the support plate 18. The hooks 23 are fitted into corresponding openings 7 on the spring plate 21.

The compression spring 22 which acts as a force storage means, the locking device formed by the lock pin 9 and the lock levers 16, and the sensor arrangement formed by the surfaces 26 and contour portions 27, are connected together to form a unit in the rest position by teh above-described retaining device 50.

Besides the above-mentioned force storage function, the compression spring 22 also has a second function in the rest condition of the arrangement, namely, in relation to the sensor assembly, it represents an inertia weight which results in an inertial movement in the event of an extreme variation in vehicle speed, more especially in a crash situation. The tubular housing 1 and therewith the compression spring 22 are preferably arranged in the direction of travel of the vehicle so that in a crash situation, that is to say in the event of a sudden increase or reduction in vehicle speed, the inertial movement mentioned above can take place. As the compression spring 22, the locking device and the sensor arrangement are arranged in succession in the axial direction, that is to say in the direction of vehicle travel, that inertial movement is directly transmitted to the sensor arrangement for releasing the locking action, as will be described in greater detail hereinafter.

As already stated, the locking arrangement formed by the lock pin 9 and the lock levers 16 is operative between the tension cable 8 or between the tension side of the compression spring 22 and the compressionside of the compression spring 22, on the plate spring 21. In a crash situation, by virtue of the inertia weight of the compression spring 22, the compression spring will perform an inertial movement in the direction indicated by the arrow Z. That inertial movement also involves the locking arrangement, that is to say the pin 9 and the lock levers 16 which engage into the pin 9. When that movement occurs, the support surfaces 26 on the lever arms 36 of the lock levers 16 move away from the surfaces, which are disposed at a stationary locationin the housing 1, of the components 27 which form the second portion of the sensor arrangement and, because of the residual torque applied and in particular also because of the outwardly directed inclined surfaces 42 of the projections 28 against which the lock levers 16 bear, the lever arms 36 are pivoted radially inwardly about th emounting locations 43 so that the locking surfaces 25 on the lock levers move outwardly to come out of engagement with the support or engagement shoulders 5 on the pin 9, whereby the locking effect of the arrangement is released. The stressed compression spring 27 can then expand in the belt tightening direction indicated by teh arrow Z in FIG. 2, and that belt tightening movement is accordingly transmitted to the tension cable 8 which in turn transmits that movement to the safety belt by way of the safety belt lock to which the cable 8 is connected. In that way slack in the belt is removed.

So that the support surfaces 26 on the lock levers 16, which form the first movable sensor portion, can move away from the sensor surfaces 27 which are arranged at a stationary location in the housing 1, the retaining device 50 is of a resilient configuration in the axial direction, relative to the tubular housing 1. For that purpose the retaining device 50 is supported by way of the springs 46 against the support plate 18. The springs 46 impart an axially directed spring force by which the sensor surfaces 26 and 27 are held in their axial direction in a rest positoin. In that rest position the movable sensor surfaces 26 on the lock levers 16 are prestressed into the rest position, relative to the stationary sensor surfaces 27 on the support plate 18. The sensitivity of th sensor arrangement may be suitably adjusted by means of the retaining force which is produced by the springs 46, in the axial direction of the assembly. For example, the response threshold of the sensor arrangement is adjusted to a value of 12.5N, in relatation to an acceleration of 6 g, by the springs 46. In a crash situation, the support surfaces 26 move in an axial direction relative to the stationary sensor surfaces 27 and move away therefrom, as already described above.

Furthermore, additional springs 37 which may be referred to as serrvo springs may be integrally formed on the spreader portion 6 of the retaining device 50. The additional springs 37 act on the free ends of the lever arms 36 on which the surfaces 26 are provided.

In order to prevent a movement in the opposite direction to the belt tightening movement of the assembly, the above-mentioned reverse motion lock device with the elliptical retaining member 10 is provided in conjuction with the braking tube 14. After a belt tightening movement has taken place (in the direction indicated by the arrow Z in FIG. 2), the tension cable 8 is subjected to a pulling crash force which acts in the opposite direction; when that pulling force is produced, an end face 35 of the cable pressing portion 11, which faces towards the member 10, comes into contact with the member 10 in the region of the rounded edge indicated at 45 in FIG. 2, ane the member 10 which is mounted on the two parallel cable strand portions 38 and 39 is pivoted or tilted in a clockwise direction in FIG. 2. As a result, the periphery of the member 10 comes into contact with the inside wall surface of the braking tube 14 and is moved into a clamping retaining position under the effect of the pulling force which acts in the opposite direction to that indicated by the arrow Z. That provides for an infinitely variable or stepless reverse motion locking effect, in the respective extended position into which the assembly is moved by virtue of the belt tightening movement. In that operative phase, the member 10 moves into the above-described clamping retaining position, without invloving any loss in regard to actuation thereof, that is to say, substantially without any delay. As a result, by means of the cable pressing portion 11 which is provided in the arrangement in any case and with which the two cable strand portions 38 and 39 are connected to the single strand portion of the tension cable 8, after a belt tightening movement has been produced and as a result of the oppositely directed pulling force applied to the cable 8 in a crash situation, the member 10 is brought into jamming engagement with the inside wall surface of the braking tube, by the member 10 being moved into that position by the adjoining end face 35 of the portion 11.

The tubular housing 1 may be closed at one end by a cover cap indicated at 20 in FIG. 2. At the other end which is closed off by a closure portion indicated at 44 in FIG. 2, the tension cable 8 which is preferably in the form of a double tension cable is passed to a safety belt lock (not shown). The cable is guided in that fashion by way of direction-changing or guide plates indicated at 3 and 4 in FIGS. 1 and 3. That arrangement ensureds that the retaining forces of the safety belt lock are carried in a crash-proof manner. As already mentioned, that design configuration permits the safety belt lock and tightening unit to be installed in a vehicle seat in an integrated fashion.

Referring now to FIGS. 3 and 4, the embodiment illustrated therein differs from the embodiments shwon in FIGS. 1, 2 and 5, essentially in that a guide tube 45 is axially telescopically displaceably arranged in the braking tube 14. Formed on one end of the guide tube 45 is a spring plate 12 against which one end of the compression spring 22 is suupported. The other end of the guide tube 45 is connected to the cable pressing portion 11 and thus to the tension cable 8, at a connecting location as indicated at 54 in FIG. 3, for example by being pressed thereto. The guide tube 45 which is telescopically displaceably guided in the braking tube 14 ensures that the guide plate 12 is guided in a jam-free manner within the housing 1 upon extension of the spring 22, to produce the belt tightening movement. A guide tube of that kind may also be provided on the spring plate 12 in the embodiment shown in FIGS. 1 and 2, in which case that arrangement also provides for jam-free guidance of the sliding ring 13 and a jam-free belt tightening movement.

In addition, the embodiment shown in FIGS. 3 and 4 provides that a securing pin member 47 is secured to the lock pin 9. The securing pin member 47 extends through the support plate 18 parallel to the axis of the assemble. Provided at the end which passes through the support plate 18 is an engagement location as indicated at 48 in FIG. 3, for a securing clip 49. The securing clip 49 is guided transversely with respect to the axial direction on the support plate 18 by means of guide bar portions 51 and 52 and can thus be brought into engagement with the engagement location 48 or removed therefrom again. That facilitates assembly of the arrangement and in particular facilitates assembly of the individual components of the sensing arrangement and insertion of the locking device and the sensor arrangement formed thereon, into the braking tube 14. In addition, that design configuration can ensure that the sensor arrangement cannot unintentionally come loose, when the belt tightening apparatus is not in use.

Referring now to FIGS. 7 through 11, the embodiments of the belt tightening appaatus illustrated therein have two housings 1 and 231 which in particular are of a tubular configuration. Arranged in the first housing 1 is the compression spring 22 which in the stressed condition forms the force storage means for producing the belt tightening movement to remove slack from the motor vehicle safety belt. Also arranged in the first housing 1 is the sensor arrangement which essentially comprises lock levers 206 (there are three lock levers 206 in FIG. 7), and a round wire ring 207 with which the lock levers 206 are hled against a lock or bolt pin 208 in a defined pivotable position. In the locked condition of the compression spring 22, the lock levers 206 each bear with sensor lever portions 217 against sensor surfaces 216 formed by shoulder-like projections on a support member 203 which is secured to the housing 1. The first housing 1 is secured to a vehicle at a stationary position thereon, for example to a part of the floor thereof, by means of a housing holder indicated at 202.

Figure 7:
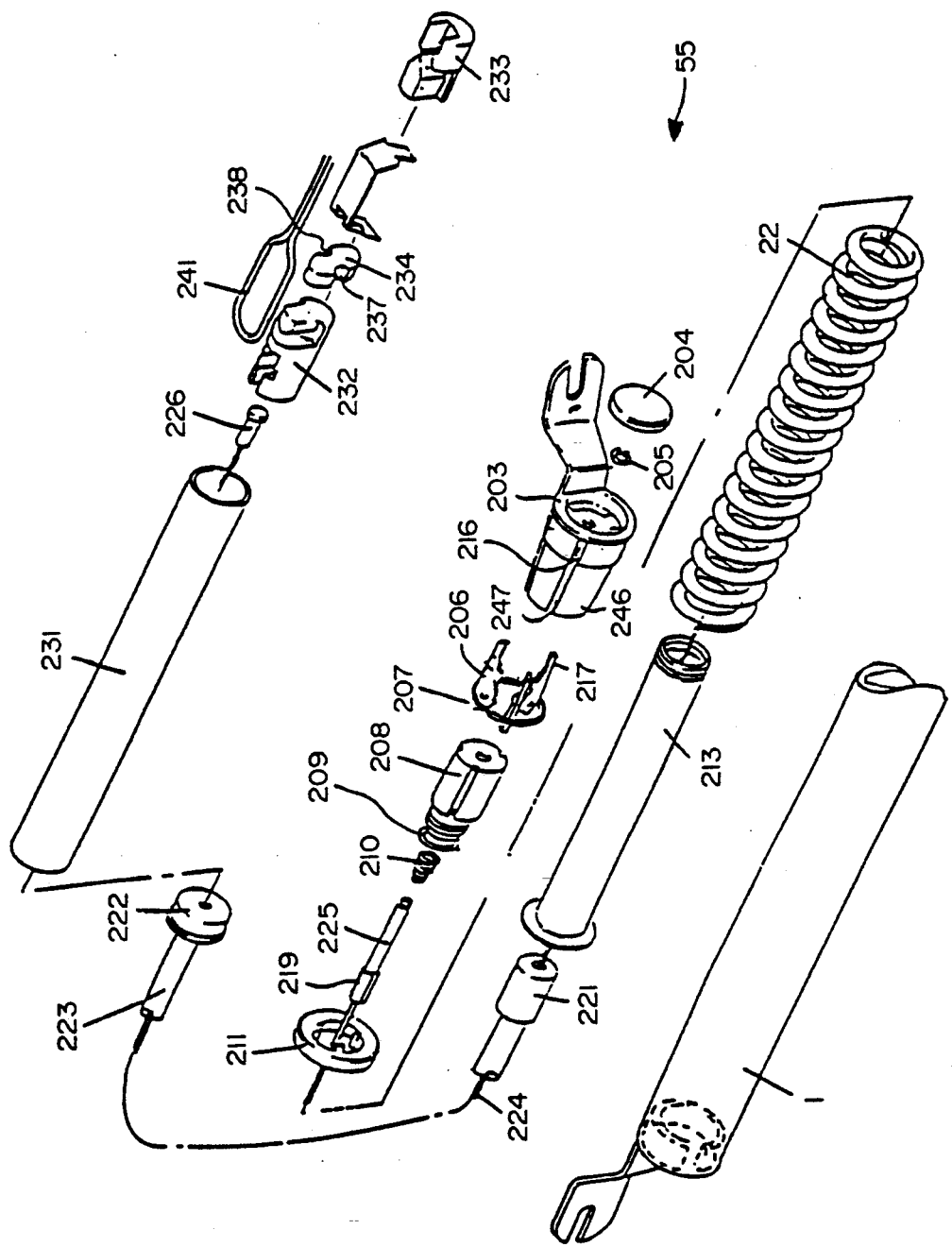
FIG. 7 is an exploded perspective view of the various components of a fourth embodiment of the device according to the invention.
Figure 10:
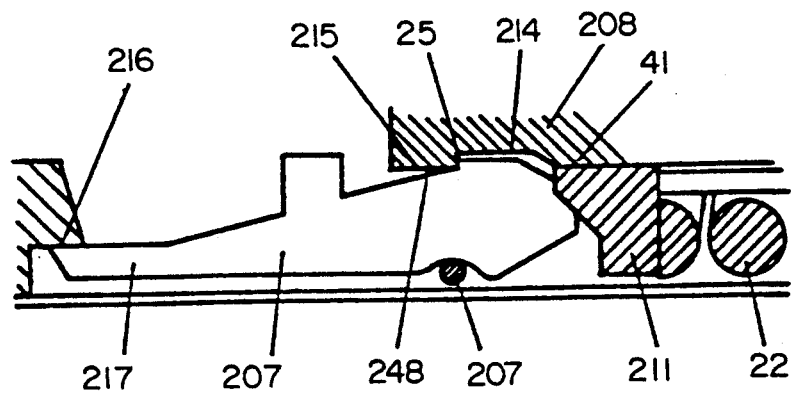
FIG. 10 is a diagrammatic view of a detail illustrating unlocking of the compression spring.

In the first housing 1, the compression spring 22 is supported at its one end by way of a spring holder 211 of annular configuration, a locking element 214 and a bolt engagement portion 215 (see FIG. 8) on a lock pin 208, relative to the support portion 203 which is secured to the housing 1. The other end of the compression spring 22 bears against a support shoulder indicated at 239 in FIG. 8, on a guide tube 213 which is also shown in FIG. 7 but without the support shoulder 239 thereon being indicated in FIG. 7. The guide tube 213 is secured to the lock pin portion 208 by means of a round wire ring indicated at 209 in FIG. 7, and projections or bead portions formed in the guide tube 213. The compression spring 22 is locked in such a way that the compression spring 22 applies a compression force to the locking element 214 at the lock lever 206, by way of the spring holder 21. The above-mentioned compression force applied by the compression spring 22 urges the locking element 214 into the engagement portion 215 on the pin portion 208. In that situation, the sensor arm 217 of the lock lever 206 bears against the sensor surface 216 on the support portion 203. The round wire ring 207 holds the lock levers 206 in a defined position relative to the portion 208. The lock levers 206 are mounted pivotably about a pivot axis 248 on the pin portion 208, in the region of the outside surface of the engagement portion 215.

In the embodiment shown in FIGS. 7 and 8, the belt tightening movement produced by the compression spring 22 is transmitted by way of a Bowden cable assembly comprising a Bowden cable wire 224 and a Bowden cable sheath or casing 223 enclosing the wire 224, to a tension cable 241 connected to a safety belt (not shown). One end of the wire 224 is fixed to the housing 1, in particular at the support member 203, for example by means of a securing ring 205. That connection is covered over relative to the exterior by a cover 204. The securing ring 205 is connected to a support pin 225 having a connecting portion 219 to which the wire 224 is secured by pressing. The support pin 225 and the enlarged connecting portion 219 are arranged coaxially in an internal bore in the lock pin portion 208. The enlarged connecting portion 219 has a support shoulder against which a sensor spring 210 is supported at one end thereof. The sensor spring 210 is in the form of a compression spring. The other end of the sensor spring 210 bears against an inwardly projecting support collar or flange portion 220 on the pin portion 208. The sensor spring 210 is in the form of a tapering spring in the embodiment shown in FIGS. 7 and 8, but it may also be in the form of a cylindrical compression spring, as shown for example in FIG. 9. A support disc (not shown) may also be provided between the connecting portion 219 and the sensor spring 210.

The Bowden cable sheathing or casing 223 is supported by way of a support portion 221 relative to the pin portion 208. The support portion 221 is guided coaxially within the guide tube 213. Preferably the Bowden cable casing 223 bears loosely against the pin portion 208. The Bowden cable assembly, that is to say the wire 224 and the casing 223 enclosing same, is guided coaxially within the first housing as indicated at 1. The Bowden cable assembly is held in a housing holder 202 by means of a clamping nipple indicated at 218.

The reverse movement lock device is arranged in a second tubular housing 231 which acts as a braking tube for the reverse movement lock device. The reverse movement lock device essentially comprises an elliptical retaining member 234 which co-operates with the inward surface of the tube in the same manner as described hereinbefore with reference for example to FIGS. 1 and 2.

As FIG. 7 shows, the retaining member 234 of the embodiment illustrated therein has lateral openings 237 and 238 into which the tension cable 241 engages.

In the second housing 231, the other end of the Bowden cable wire 224 is also connected to the tension cable 241. For that purpose the end of the wire has a tapered nipple 226 pressed thereon, the nipple being fitted into a cable anchor 232 which thus acts as a connecting portion. The end loop of the tension cable 241 is also fitted into the cable anchor 232.

In addition, the end loop of the tension cable 241 is disposed in the two openings 237 and 238 in the retaining member 234, and in a cable guide portion 233. That ensures that the tension cable 241 and the cable wire 224 are satisfactorily axially guided within the housing 231.

The retaining member 234 is readily displaceable without a clamping action in a rest condition and in a belt tightening movement in the direction indicated by the arrow A in FIG. 8, when the member 234 is in the defined inclined position shown in FIG. 8. For that purpose, provided on the guide portion 233 is an inclined guide surface which defines the clamp-free inclined positioning of the retaining member 234.

A limb of a securing spring 235 is disposed between the inclined guide surface on the cable guide portion 233 and the retaining member 234. The spring 235 is of a substantially U-shaped configuration and is supported by way of its other limb in the cable anchor 232.

After the belt tightening movement comes to an end, the spring 235 causes the retaining member 234 to pivot in the direction indicated by the arrow B in FIG. 8 so that the retaining member 234 tilts into a clamping retaining position. In that situation, the retaining member 234 is clamped or jammed in the interior of the housing 231, which then acts as a braking tube. It is then no longer possible for the tension cable 241 to move in the opposite direction to the belt tightening direction indicated at A. That therefore ensures that slack is reliably removed from the safety belt.

The other end of the Bowden cable casing 223 is non-displaceably supported and secured against the second housing 231 by means of a support portion 222 at the other end of the housing 231.

If, after release of the locking assembly and in particular the locking element 214 out of the locking position, the compression spring 22 expands from the rest position shown in FIG. 8, then the guide tube 213 is moved towards the right in FIG. 8. In that movement the pin portion 208 is also moved towards the right. That movement is indicated by the arrow C in FIG. 8A. In that movement, the Bowden cable casing 223 is also moved towards the right, with the clamping nipple portion 218 possibly also being urged out of the clamping position. As FIG. 8A shows, the loop with which the Bowden cable assembly goes from housing 1 to the housing 231 is enlarged. The enlargement in the loop configuration is shown in broken lines in FIG. 8A. As one end of the Bowden cable wire 224 is secured to the stationary housing 1, the enlargement of the loop configuration of the Bowden cable is transmitted to the other end of the wire 224 which, as described above, is connected to the tension cable 241. As a result that end of the wire 224 and therewith also the tension cable 241 perform the necessary belt tightening movement in the direction indicated by the arrow A in FIG. 8A.

Referring now to FIG. 9, the embodiment illustrated therein differs from the construction shown in FIGS. 7 and 8 in that the belt tightening movement produced by the compression spring 22 is transmitted directly to the Bowden cable wire 224. It will be appreciated that, in this embodiment, instead of the interposition of the Bowden cable wire 224, the tension cable may also be caused directly to perform the belt tighening movement produced by the compression spring 22 in the released condition thereof, as described in greater detail hereinbefore.

The arrangement in the second housing 231 which thus provides the reverse motion lock device to prevent the reverse movement of the tension cable, is the same as in the embodiment described with reference to FIGS. 7 and 8.

In the FIG. 9 embodiment, the wire 224 of the Bowden cable assembly is connected at its end to the guide tube 213. For that purpose the wire 224 may be secured directly at the wire fixing 240 on the guide tube 213, or a pin member may be fixed in the wire fixing 240 and that pin member may in turn be connected to the wire 224 by a connecting portion 219. As in the embodiment illustrated in FIGS. 7 and 8, the connecting portion 219 is axially guided in an internal bore in the locking pin portion 208. The sensor spring 210 which is in the form of a compression spring is fitted between the connecting portion 219 which is increased in width in relation to the wire 224, and the support collar or flange portion 220 on the locking pin portion 208. In the FIG. 9 embodiment the sensor spring 210 is shown in the form of a cylindrical spring but it may also be in the form of a tapered spring as in the embodiment shown in FIGS. 7 and 8.

After the locking action for the compression spring 22 has been released, the compression spring 22 expands and produces a belt tightening movement in the direction indicated by the arrow D. The cable 224 is moved within the Bowden cable casing 223, in the same direction. That movement is also shown in FIG. 9A. The end of the wire 224 which is secured to the guide tube 213 is also moved in that direction. The belt tightening movement is also transmitted to the other end of the wire 224 which is connected in the second housing 231 to the tension cable in the same manner as in the embodiment shown in FIGS. 7 and 8. The tension cable is therefore subjected to the necessary belt tightening movement in the direction indicated by the arrow A, to remove slack from the safety belt.

The locking assembly with which the compression spring 22 is locked to the locking pin portion is released substantially in the same manner as described above.

In the FIG. 9 embodiment, to provide for locking of the compression spring 22 in the same manner as in the construction shown in FIGS. 7 and 8, the locking element 214 is pressed against the locking pin portion 208, between the annular spring holder 211 and the locking engagement portion 215. The locking element 214 is integrally provided on the lock lever 206 (as also in the construction shown in FIG. 10 which represents a view on an enlarged scale in relation to the embodiment shown in FIGS. 7 and 8). While in the embodiment shown in FIG. 10 the sensor arm 217 which is also provided on the lock lever 206 bears against the sensor surface 216 which is formed on the support portion 203, the construction shown in FIG. 9 provides that disposed at a stationary location on the housing 1 is an engagement portion 245 which is secured to the inside wall surface of the housing 1 and which carries the sensor surface 216 against which the sensor lever 217 engages by way of a sensor surface thereof. Between the engagement portion 245 and the lock lever 206 is a spacing L which permits the sensor lever 217 to come out of engagement with the sensor surface 216 on the engagement portion 245, in a crash situation. For that purpose, there is a further spacing Z between the spring holder 11 and support portion 203. In FIG. 9, as shown also in FIGS. 7 and 8, the locking pin portion 208 is guided in the axial direction in a guide sleeve 246 which is formed on the support portion 203. The guide sleeve 246 has guide slots 247 in which the lock levers 206 are disposed.

In response to an extreme variation in speed, more particularly in a crash situatin, the compression spring 22 acts as an inertia weight and moves towards the right in FIGS. 8 and 9. As a result the sensor surfaces 216 come out of engagement with the sensor surfaces 217 and the compression force exerted by the compression spring 22 on the locking elements 214 at the lock levers 206 causes the locking elements 214 to be pivoted out of their locking position about a pivot axis 248 which is disposed in the region at which the lock levers 206 bear against the pin portion 208, to such an extent that the locking elements 214 come out of engagement with the engagement portion 215 on the pin portion 208. That releases the locking action on the compression spring 22 which can thus expand and produce the belt tightening movement to remove slack from the safety belt. In the construction shown in FIG. 9 the compression spring 22 then bears against the support portion 203 by way of the spring holder 211.

Figure 11:
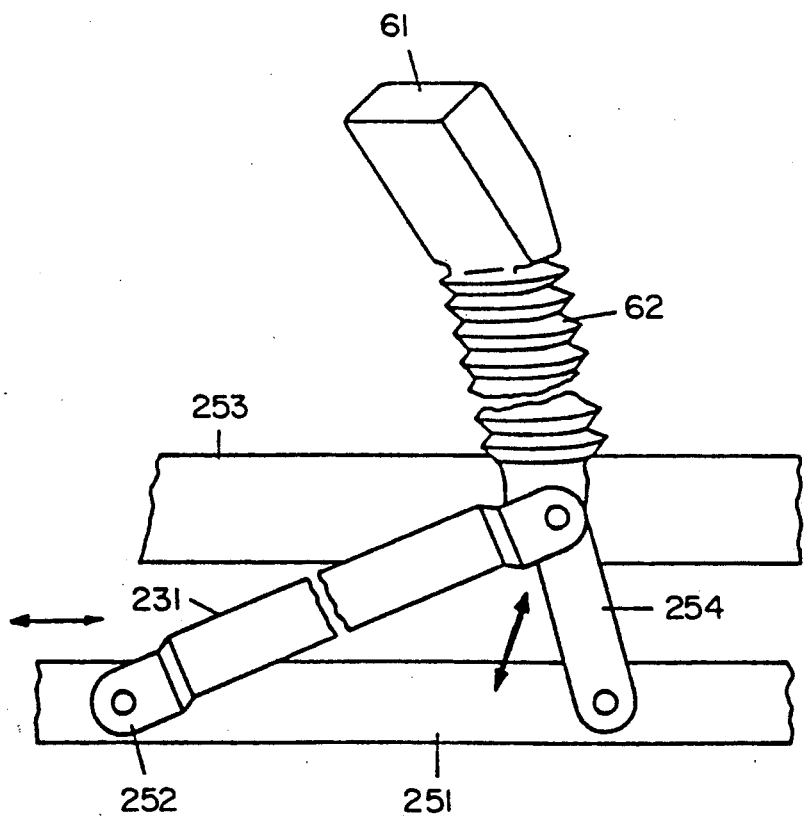
FIG. 11 is a diagrammatic view illustrating adjustability in respect of height of a second housing which is used in the embodiments illustrated in FIGS. 7 through 10 and which contains a reverse motion lock device.

Referring now to FIG. 11, shown therein is a construction whereby it is also possible to produce adjustment in respect of a seat with which the motor vehicle safety belt is associated, and of which FIG. 11 diagrammatically shows a seat squab portion 253, by virtue of the second housing 231 which includes the reverse motion lock device. For that purpose, at least the end portion of the housing 231 from which the tension cable goes by way of a direction-changing means and a belt tightening shaft 62 to a belt lock in a manner which will be described in greater detail hereinafter with reference to FIGS. 12 through 15, can also be involved in the heightwise adjustment of the vehicle seat portion 253. For that purpose the corresponding end of the housing 231 is pivotally secured to a pivot lever 254 which in turn is pivotably secured to the displaceable rail member 251 of the seat structure. The other end of the second housing 231 is displaceably connected to the displaceable seat rail member 251 by means of a holder indicated at 252.

Figure 14:
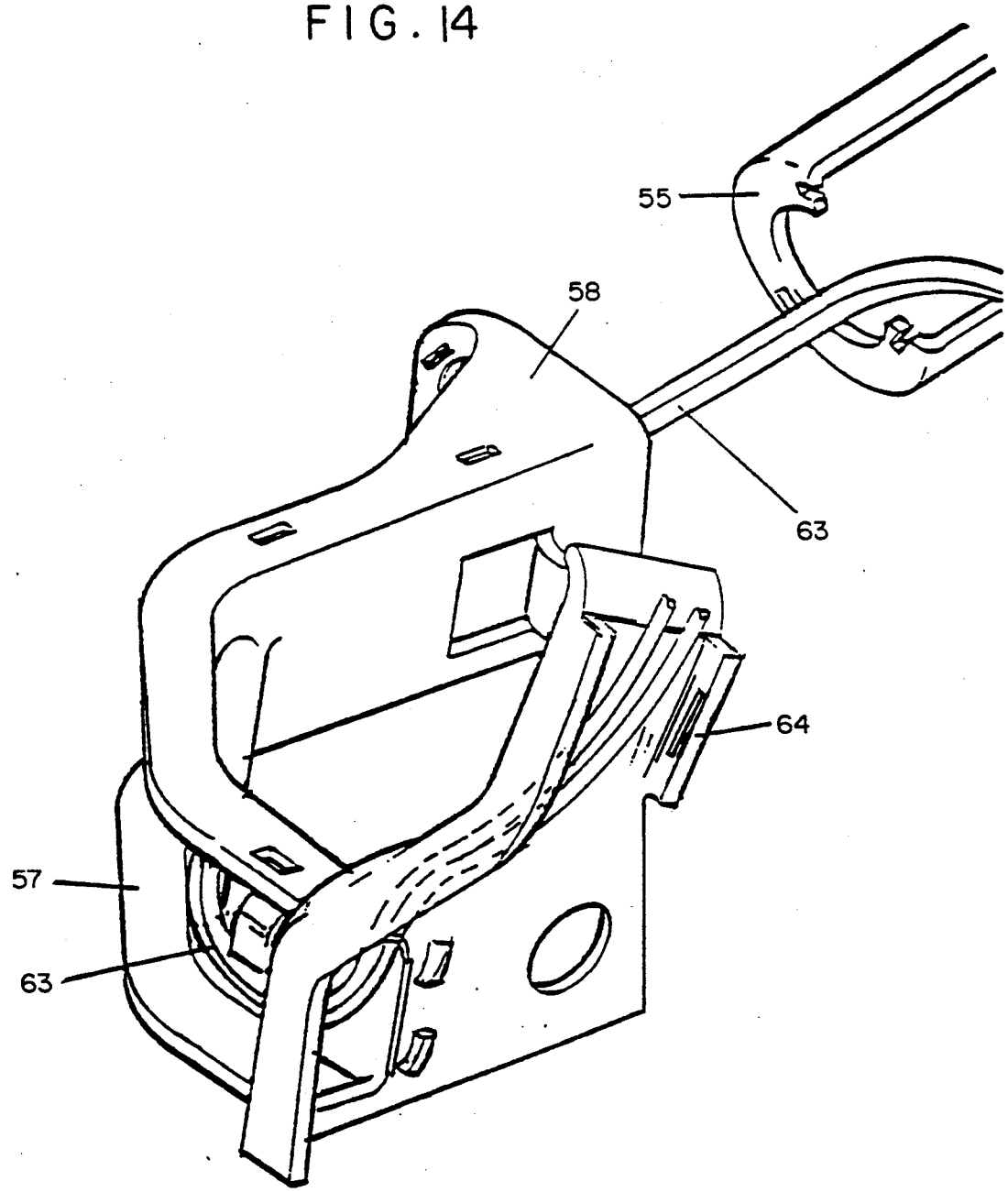
FIG. 14 shows an embodiment of the tension cable direction-changing means, which is modified relative to the structures shown in FIGS. 12 and 13.
Figure 15:
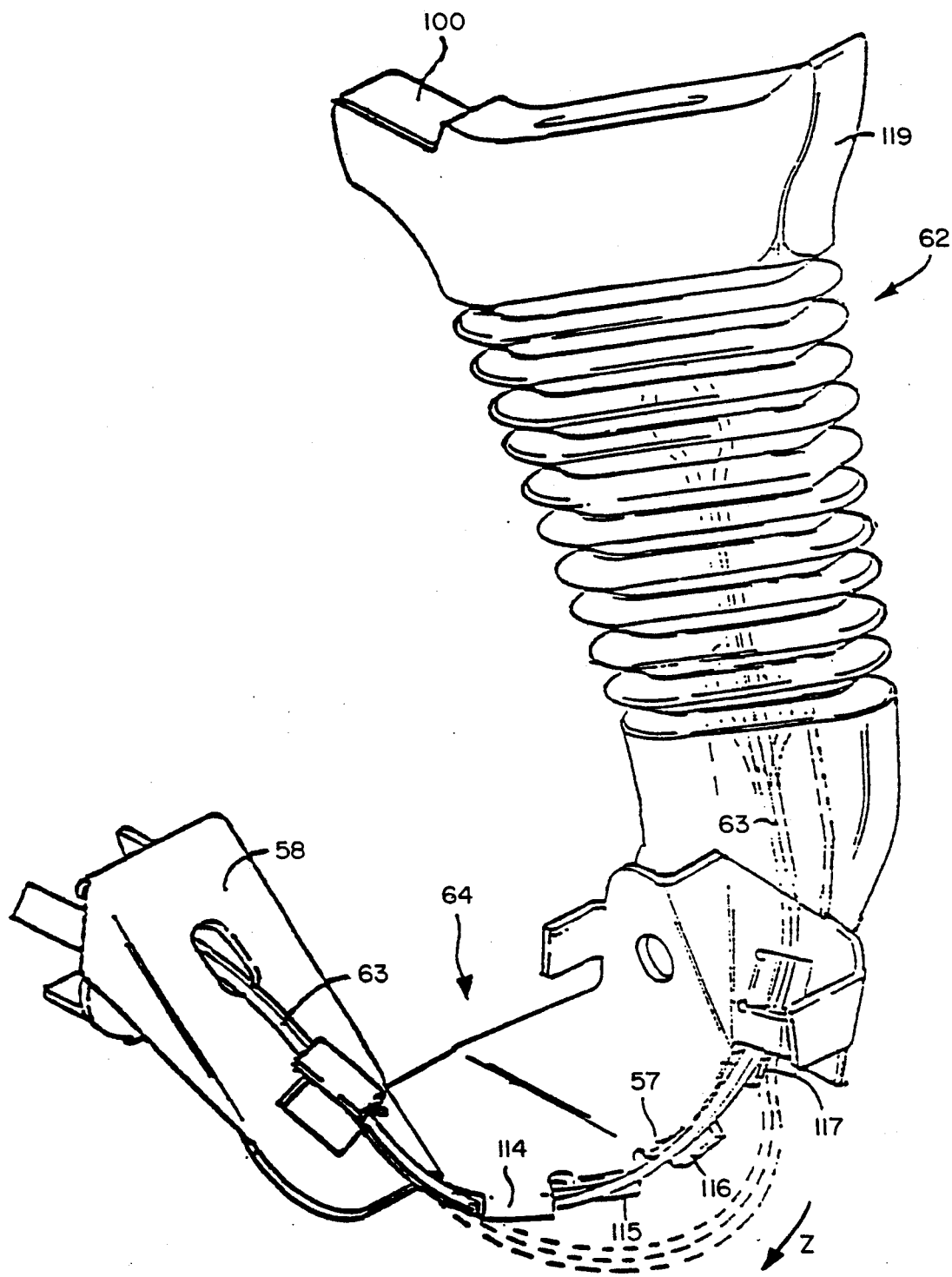
FIG. 15 shows yet another embodiment of the tension cable direction-changing means.

Reference will now be made to FIGS. 12 through 15 showing embodiments in which the cable guide path 57 at the direction-changing plate structure 64 is of a three-dimensional curved configuration extending substantially at the edge of the plate member 64. The cable guide path in FIGS. 13 and 15 is formed by direction-changing elements 114–117 which are shaped on the appropriate structure by stamping and suitable bending-over at the edge of the plate arrangement. The shape of the plate structure 64 and its fixing to the seat structural member 56 which may preferably be the displaceable anchor rail of the vehicle seat, which is towards the transmission tunnel side thereof, is such that the retaining forces which are produced by the safety belt and which are transmitted by way of the belt lock 61 and the tension cable 63 in the belt tightening shaft 62 are suitably carried. As can be seen from FIG. 12, the belt tightening device and in this case in particular the structure 64, is secured to a fixing plate member 121 of the seat structural member 56 which is the upper displaceable anchor rail of the vehicle seat. The displaceable anchor rail is guided displaceably in a lower mounting rail 122 which is secured by a fixing plate 123 to the floor of the vehicle. In that way the entire belt tightening device (belt tightening unit 55, direction-changing structure 64 and belt tightening shaft 62) is moved in conjunction with the seat. In addition the belt tightening device is also secured to the displaceable anchor rail of the seat structure with a front holder 124 on which the front end of the belt tightening unit 55 is mounted.

In the embodiment shown in FIG. 14 the direction-changing arrangement 64 is also in the form of a plate structure in the shape of a guide frame assembly. The guide frame assembly has an outer cable guide path provided by portions formed into the metal plate. As in the FIG. 12 construction, the cable guide path 57 is of a channel-like configuration, with the cable guide paths 57 in the embodiments of FIGS. 12 through 15 each being open in one direction. That affords the possibility of the tension cable 64 deflecting or departing from the cable guide path, if for example the portion of the tension cable in the belt tightening shaft 62 performs a movement due to a pressure being applied to a head portion 119 of the belt tightening shaft 62, with the deflected condition of the tension cable being shown in broken lines in FIG. 15. That means that the movement of the portion of the tension cable in the belt tightening shaft 62 is not continued into the belt tightening unit 55 and the sensor arrangement disposed therein, thereby preventing the sensor arrangement from being improperly triggered off. In order to provide for a defined deflection of the tension cable 63 in the region of the direction-changing arrangement therefor, the assembly may also have guide plates which are suitably shaped thereon and within which the tension cable can perform the deflection movement shown in broken lines. When the head portion 119 has returned to its initial position, the tension cable 63 is also moved back into its proper position in the cable guide path 57.

The belt lock 61 is arranged in the head portion 119 of the shaft 62 in the embodiments shown in FIGS. 12 and 15. In FIG. 13 it can be seen that the tension cable 63 is connected by its one end to the belt lock 61.

The other end of the tension cable 63 goes to the belt tightening unit 55, with the tension cable 63 extending substantially parallel to the longitudinal axis of the vehicle as indicated at A. Connected to the belt tightening unit 55 is a tension cable guide indicated at 58 in FIG. 12 which guides the tension cable 63 parallel to the axis A of the vehicle, as far as the direction-changing arrangement 64.

In the tightening unit 55 the tension cable 63 is connected to a force storage means which is preferably in the form of a compression spring. The belt tightening unit 55 is preferably in the form of a mechanical unit, as already described above. In the rest position the force storage means such as a compression spring is held in a prestressed condition in the belt tightening unit 55 and the belt lock 61 occupies its normal position shown in solid lines in FIG. 13. In FIGS. 12 and 15, the belt lock is disposed in a head portion 119 of the belt tightening shaft 62. The belt tightening shaft 62 in those structures is designed to be collapsible in the middle region thereof, in the direction of the belt tightening movement, while in the structure shown in FIG. 13 the belt tightening shaft 62 is overall in the form of a rigid housing. In the rest position of the belt locks as shown in FIGS. 12 through 15, the safety belt may be locked for normal operation of the vehicle, at a hip point at which the belt lock 61 is positioned. In response to an extreme variation in vehicle speed, caused for example by sudden deceleration or acceleration thereof, which may be due to an accident, the belt tightening unit 55 pulls the tension cable 63 in the belt tightening direction indicated by the arrow Z in FIG. 15, so that the belt lock occupies the position shown in broken lines in FIG. 13. In FIGS. 12 and 15 the belt tightening shaft 62 is collapsed in a bellows-like manner, with the head portion 119 and the belt lock arranged therein occupying a downwardly moved or lower position.

For the purposes of releasing the belt lock, the embodiments shown in FIGS. 12 through 15 have unlocking or release buttons indicated at 100, separately from the belt lock 61. The safety belt (not shown) can be released by means of those buttons, both in the normal condition of operating a vehicle and also when the belt lock is in the position which it adopts when the belt has been tightened by the belt tightening arrangement. As shown in FIG. 13, for that purpose connected to the release button 100 is an actuating rod 59 which is arranged within the belt tightening shaft 62. The actuating rod 59 is rigidly connected to the resiliently mounted button 100 and is axially displaceably mounted in the belt tightening shaft 62. Also connected to the actuating rod 59 is a release lever 112 which is pivotally mounted to the belt lock 61 at a pivot axis. When the button 100 is depressed, that movement is transmitted by way of the actuating rod 59 to the release lever 112 and, upon pivotal movement thereof, it accordingly acts on a release element 111 provided on the outside of the belt lock 61. The belt lock 61 may be of a known design configuration or it may be for example of the structures as described in German patent applications Nos. P 39 32 090.1 and 40 05 481.0 to which reference may be accordingly be directed and which thus guarantee a flat or shallow design configuration for the arrangement.

As the construction shown in FIG. 13 illustrates, when the lock 61 is in the belt-tightened position, the release lever 112 is moved along the actuating rod 59 so that the belt lock 61 can be released, even when the lock is in the condition in which the slack has been removed from the belt. That entrainment movement of the lever 112 is produced by virtue of an entrainment member 113 formed on the housing of the belt lock 61.

At its free end the release lever 112 has two clamping fingers 125 and 126 which co-operate with the actuating rod 59 in the following manner. When, in the belt tightening operation, the belt lock 61 is pulled downwardly into the position shown in broken lines in FIG. 13, the two clamping fingers 125 and 126 are entrained along the actuating rod 59 without any clamping action thereon. When however the actuating rod 59 is moved downwardly in its axial direction by the release button 100 being depressed, the two clamping fingers 125 and 126 come into clamping engagement with the actuating rod 59 as they are movable over an arcuate path around the pivotal mounting point 118. As a result the axial movement of the actuating rod 59 is transformed into a pivotal movement of the release lever 112 and the pivotal movement of the release lever 112 is transmitted to the release element 111 of the belt lock 61.

If, when the release button 100 is released, the actuating rod 59 moves upwardly again, the clamping fingers 125 and 126 are moved with the actuating rod 59, back into the starting position as shown in FIG. 13.

FIGS. 17A through 17C show a construction in which the compression spring 22 and the reverse movement lock device are arranged in separate tubular housings 1 and 23, as in the embodiments shown in FIGS. 7 through 9. Instead of the Bowden cable assembly shown therein for transmitting the belt tightening movement produced by the compression spring 22 to the tension cable 63, the construction shown in FIGS.

17A through 17C uses a tilting or tipping lever 258 acting on a pull rod 259. The pull rod 259 is connected to the tension cable 63 by way of the cable anchor 232, as already described in detail with reference to FIGS. 7 through 9.

The lever 258 is pivotally mounted at the front end of the compression spring 22 on the guide tube 213 by way of a mounting spring 260. In the rest position shown in FIG. 17A, in which the compression spring 22 is blocked or locked, the braking tube 231 which also forms the housing for the reverse movement lock device, can be moved together with the rod 259 in the directions indicated by the arrows E and F, together with the vehicle seat. For that purpose the braking tube 231 may be connected to the upper seat rail which is displaced with the vehicle seat squab portion, or the braking tube 231 may be formed in one piece with that rail. In the position shown in FIG. 17A, the rod 259 is then displaced without a clamping action in an opening in the lever 258 which is arranged substantially normal to the rod 259.

The housing 1 in which the locking device and the compression spring 22 are arranged is secured to the chassis of the vehicle at a stationary location thereon. For example the housing 1 may be arranged on or made in one piece with the lower stationary mounting rail of the seat structure.

As soon as the locking device is released by virtue of an external force acting thereon, as described in detail hereinbefore, the compression spring 22 expands and moves abruptly in the direction indicated by the arrow Z in FIG. 17B. As a result the tilting lever 258 is pivoted at its mounting location (mounting spring 260) in the direction indicated by the arrow G. In that pivoted position as shown in FIG. 17B, the lever 258 comes into clamping engagement with the pull rod 259 in the region of the opening in the lever 258 through which the rod 259 passes. The movement component in the direction indicated by the arrow Z, of the compression spring 22, is thus transmitted by way of the lever 258 to the rod 259 and thereby to the tension cable 63. As already described above with reference to Figures 12 through 15, the tension cable 63 is connected to the safety belt whereby the belt tightening movement produced by the action of the compression spring 22 is transmitted to the safety belt. To remove all the slack from the safety belt, the compression spring 22 moves into the limit position shown in FIG. 17C.

Figure 18:
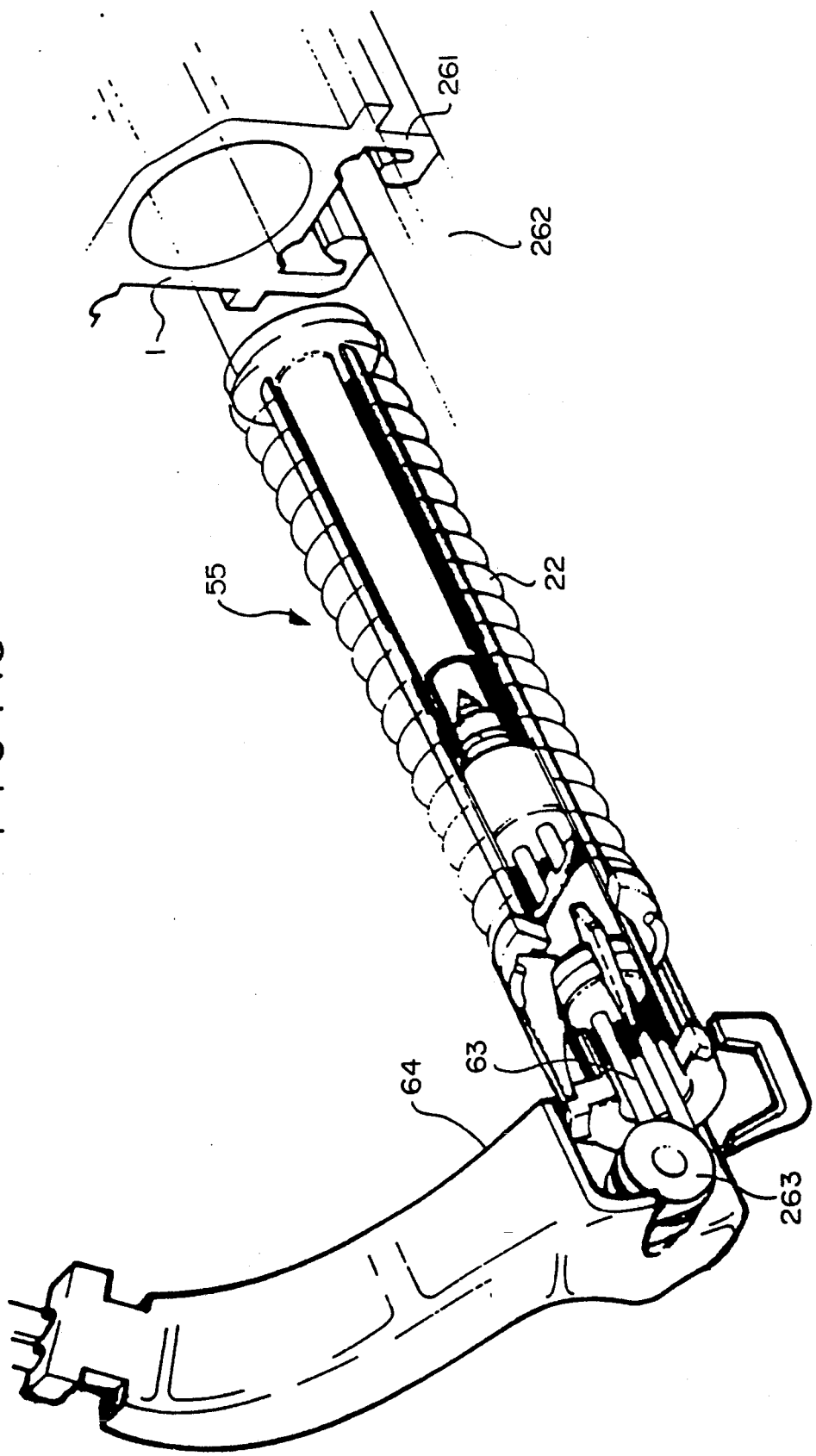
FIG. 18 is a perspective view of a seventh embodiment of the invention illustrating the belt tightening apparatus which can be fitted into an upper rail of a vehicle seat structure, which is movable with the vehicle seat.

Referring now to FIG. 18, in the embodiment illustrated therein, the belt tightening unit 55 which is shown in an assembled condition can be installed in the housing 1 which is made on one piece with the upper mounting rail 261 of the seat structure, which is displaceable with the squab portion of the seat. For that purpose the belt tightening unit 55 may be of a configuration as described above with reference to FIGS. 1 through 6. The tension cable 63 is guided in the direction-changing means 64 around a guid roller 263 and connected to the lock of a safety belt for example in the manner described with reference to FIGS. 12 through 15.

Figure 19:
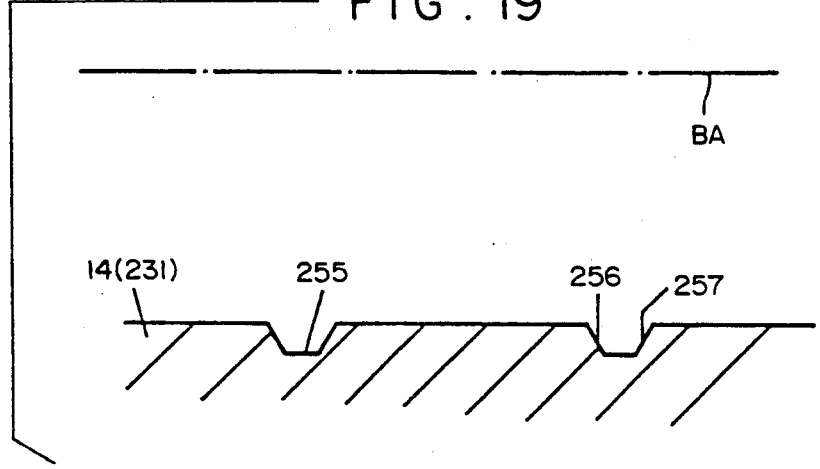
FIG. 19 is a view in cross-section illustrating grooves which are formed in the inside wall of a braking tube of a reverse movement

With reference now to FIG. 19, it will be seen therefrom that the inside wall surface of the braking tube 14 or 231 in the embodiments described above is provided with a groove structure which is formed therein and which consists of grooves 255 arranged in a plane normal to the axis BA of the braking tube. The grooves 255 extend parallel to each other in the inward surface of the tube. The grooving ensures that the elliptical retaining member 10 or 234 in the above-discussed embodiments is properly afforded the possibility of becoming anchored against the tube at the edge of the elliptical retaining member, so that the retaining member is then properly pivoted into its clamping retaining position. Preferably the corss-sectional configuration of each groove 255 is such as to have inclined side surface 256 and 257. In the structure shown in FIG. 19 the cross-sectional configuration of each groove 255 is substantially U-shaped with the inclined side surfaces 256 and 257. It is also possible however for the grooves to be of a V-shaped configuration. A suitable anchoring effect is afforded for the edge of the elliptical retaining member 10 or 234, even when the grooves are of a U-shaped cross-section, so that the retaining member can properly assume the clamping position required for preventing reverse movement of the tension cable in the respective braking tube 14 or 231. The edge of the ret ning member may therefore also be rounded off, as referred to above.

Figure 20:
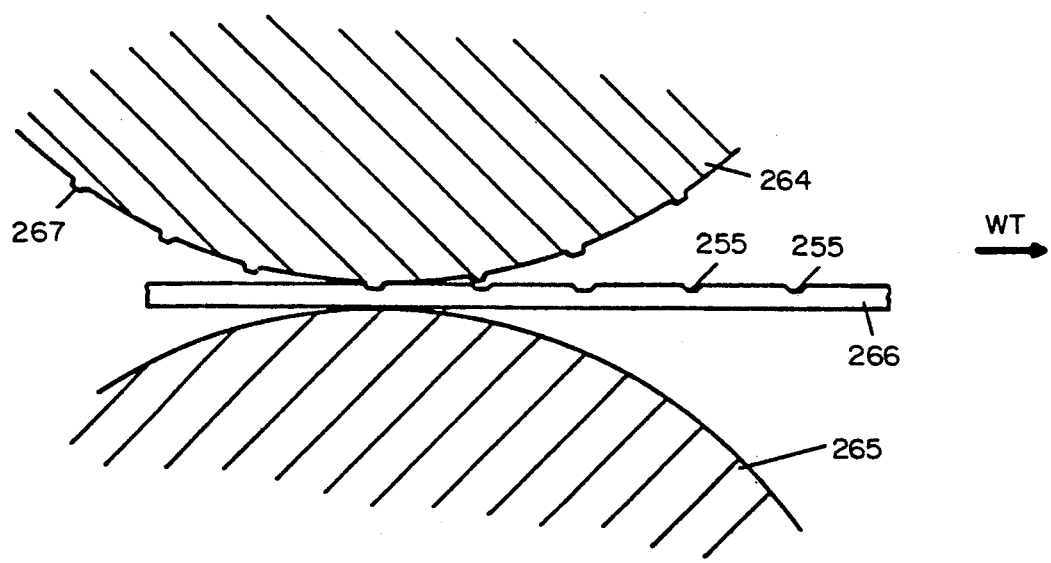
FIG. 20 shows an embodiment of a rolling arrangement for producing the grooves in the starting material used to produce the braking tube.

Referring now to FIG. 20, show therein is an apparatus for producing the grooves 255 in the inside wall of the braking tube. For that purpose, starting material 266 in strip from is passed between two rolls of which one is a profile roll 264 and the other is in the form of a backing roll 265. The roll 264 is provided at its peripheral surface with suitable projections 267 which form the grooves 255 in the material 266 in the rolling operation. In the illustrated embodiment the grooves 255 extend at least substantially normal to the direction of transportation movement as indicated by the arrow WT, in the rolling operation.

The starting material in strip form is then formed into a tube in a known cylindircal bending machine (not shown), and welded at the adjoining edges to provide a closed tube configuration. Strip steel or wide-strip or plate bending machines of that kind, which can bend sheet metal to form a cylindrical casing and provide for welding thereof at the adjoining edges are known and will therefore not be described in greater detail herein.

It will be apppreciated that it is also possible for the roll 264 to be so designed that the projections thereon, for forming the grooves 255, do not extend parallel to the axis of the roll, as in the FIG. 20 construction, but are provided on the peripheral surface of the roll in the form of projections extending around the roll in an annular congfiguration. The initial material 266 for the braking congtube to be produced therefrom is then approximately of a width which corresponds to the length of the tube to be made therefrom.

It will be appreciated that the above-described constructions and procedures have been set forth solely by way of example and illustration of the present invention and that various other modifications and alterations may be made therein without thereby departing form the spirit and scope of the invention.

We claim:

1. Apparatus for tightening a safety belt in a vehicle, for remvoing slack from a safety belt in a fitted condition, comprising: a belt tightening means including a housing, a compression spring disposed in the housing, and a locking means which is adapted to hold said compression spring in a streesed condition in a locked rest position, thereby to form a force storage means for producing a belt tightening motion component such as to remove slack from the belt; a sensor means which has the compression spring as a movable inertia weight for releasing the locking means in response to an extreme variation in the speed of said vehicle; and a tension cable operatively connected to said belt tightening means and the safety belt and adapted to transmit the tightening motion component produced by the belt tightening means, to the safety belt wherein said locking means is adapted to move with said compression spring thereby forming a motion unit, said sensor means comprising a first sensor portion formed on said locking means and a second sensor portion bearing against the second sensor portion in the rest position of the arrangement, wherein the first sensor portion moves away from said second sensor portion to release the locking effect in response to movement of said motion unit, which is casued by an extreme variation in the speed of said vehicle.

2. Apparatus as set forth in claim 1 wherein said locking means comprises a lock pin means which is adapted to act on said tension cable, wherein said locking means includes at least one locking element adapted to engage into said lock pin means in the rest position of the apparatus, and wherein said locking element is adapted to pivot about a pivot axis out of its locking position in response to movement of said motion unit.

3. Apparatus as set forth in claim 1 wherein said compression spring is adapted to apply an unlocking force to said locking means when said sensor portions are in a position of being moved away from each other.

4. Apparatus as set forth in claim 1 wherein said compression spring is in the form of a spiral compression spring, wherein said housing is of a tubular configuration, and wherein said compression spring is guided movably in the housing in the axial direction thereof.

5. Apparatus for tightening a safety belt in a vehicle, for removing slack from a safety belt in a fitted condition, comprising: a belt tightening means including a housing, a compression spring disposed in the housing, and a locking means which is adapted to hold said compression spring in a stressed condition in a locked rest position, thereby to form a force storage means for producing a belt tightfening motion component such as to remove slack from the belt; a sensor means which has the compression spring as a movable inertia weight for releasing the locking means is response to an extreme variation in the speed of said vechicle; and a tension cable operatively connected to said belt tightening means and the safety belt and adapted to transmit the tightening motion component produced by the belt tightening means, to the safety belt wherein said compression spring has first and second ends supported against said locking means and wherein one of said first and second ends of said compression spring operatively engages said tension cable, and wherein said compression spring in a stressed condition and said locking means in the locked condition form a motion unit.

6. Apparatus as set forth in claim 5 wherein the oppositely directed support forces of said compression spring are largely carried by the at least one locking element, and wherein said locking element includes a lock lever portion, a part of the lock lever portion providing a first sensor portion which is adapted to be urged towards a second stationary sensor portion, with a residual torque forming said unlocking moment.

7. Apparatus as set forth in claim 5 wherein said belt tightening means includes mounting means for connecting same to a structural member of a seat of a vehicle.

8. Apparatus as set forth in claim 5 wherein said housing accomodates said sensor means and said compression spring and includes means for mounting the housing to a vehicle at a stationary position in relation thereto, and further including a reverse motion locking means adapted to lock said tension cable in a direction of movement in opposite relationship to said belt tightening movement, said revers motion locking means including a second housing adapted to be displaced with a vehicle seat upon adjustment thereof.

9. Apparatus as set forth in claim 8 and further including a Bowden cable assembly for transmitting to said tension cable a belt tightening movement caused by said compression spring when unlocked.

10. Apparatus as set forth in claim 9 wherein said Bowden cable assembly comprises a Bowden cable wire and a cable sheath, wherein said wire has first and second ends of which a first end is secured to said first-mentioned housing and said second end is connected to said tension cable, and wherein said cable sheath has first and second ends, of whcih said first end is connected to a component adapted to be moved by said compression spring when unlocked, for movement with said component, while the second end of said cable sheath is stationarily secured to said second housing.

11. Apparatus as set forth in claim 9 wherein said Bowden cable assembly comprises a cable wire and a cable sheath, wherein said cable wire has first and second ends, said first end being connected to a component which is adapted to be moved by said compression spring when unlocked, while said second end of said cable wire is operatively connected to said tension cable.

12. Apparatus as set forth in claim 9 wherein siad Bowden cable assembly comprises a cable wire and a cable sheath, wherein said cable sheath is movably guided on said first-mentioned housing in the direction of a belt tightening movement produced by the effect of said compression spring, wherein said cable wire has an end connected to said tension cable, and wherein the safety belt tightening movement is transmitted to said end of said cable wire by virtue of the movement of said cable sheath relative to said first-mentioned housing.

13. Apparatus as set forth in claim 9 wherein said second housing provides a braking tube member for said reverse motion lock means.

14. Apparatus as set forth in claim 8 wherein said second housing has at least a first end from which said tension cable extends for operative connection to said safety belt, and further including means for mounting said second housing in such a way that said first end thereof is adjustable in respect of height with a seat of a vehicle in which the apparatus is used.

15. Apparatus as set forth in claim 8 and further comprising a tilting lever displaceable between tilted and untilted positions and adapted to act as a transmission means for transmitting a belt tightening movement porduced by said unlocked comprission spring to said tension cable, and further including a pull bar member which is connected to said tension cable and which, when said compression spring is in a locked condition, is capable of movement without a clamping effect with the tilting lever in one of its positions and which, when said compression spring is in an unlocked condition, is in clamping engagement with said pull bar member when said tilting lever is in its said other position.

16. Apparatus as set forth in claim 18 wherein said pull bar member is capable of movement without a clamping effect when said tilting lever is in its untilted position and said pull bar member is in clamping engagement with said tilting lever when said tilting lever is in its telted position.

17. Apparatus as set forth in claim 5 and further including a cable guide means around which said tension cable passes outside said housing to a safety belt lock device to which lap and shoulder belt portions are connected when said safety belt is in a condition of being fitted to a passenger in a said vehicle.

18. Apparatus as set forth in claim 16 and further including a belt tightening shaft member in which said safety belt lock device and said tension cable directly connected to said safety belt lock device are guided movably along a guide path; said cable guid means is connnected to said belt tightening shaft member and is secured to a structural component of a seat with which said safety belt is operatively associated, together with said belt tightening means; and the arrangement is such that retaining forces produced by the safety belt and adapted to be transmitted to said tension cable by way of said safety belt lock device are carried by said cable guide means and transmitted to said seat structural member.

19. Apparatus as set forth in claim 18 and further including a tension cable guide means adapted to be disposed in substantially parallel relationship to the longitudinal axis of the vehicle, and a guide path for said tension cable and said safety belt lock device, which extends to a hip point of the safety belt assembly in said belt tightening shaft member, and wherein said cable guide means has an arcuate guide path for said tension cable, said arcuate calbe guide path being arranged between said tension cable guide means and said guide path extending to the hip point.

20. Apparatus as set forth in claim 19 wherein said cable guide means is in the form of a cable guide plate member and wherein said arucate cable guide path on said cable guide means comprises a three-dimensional curvature configuration and is formed in said cable guide plate member along an edge thereof.

21. Apparatus as set forth in claim 19 wherein said cable guide path is opened in a direction opposite to the direction of forces to be carried by said cable guide path.

22. Apparatus as set forth in claim 17 and further including an unlocking buttom for releasing said safety belt, the unlocking button being provided separately from the safety belt lock device, and further including an unlocking member on the safety belt lock device, and an actuating mechanism, the arrangement being such that said unlocking button is adapted to act on said belt unlocking member by way of said actuating mechanism.

23. Apparatus as set forth in claim 22 and further including an actuating bar member which is arranged parallel to the belt tightening movement of the safety belt lock device in the interior of the belt tightening shaft member which is of a rigid configuration, said actuating bar member being connected to said unlocking button provided separately from said safety belt lock device on said belt tightening shaft member and said unlocking member, by way of an unlocking lever pivotally connected to the safety belt lock device, wherein in a belt tightening movement of said safety belt lock devie, said unlocking lever is entrained along the actuating bar member.

24. Apparauts for tightening a safety belt in a vehicle, for remvoing slack from a safety belt in a fitted condition comprising: a belt tightening means including a housing, a comrpession spring disposed in the housing, and a locking means which is adapted to hold said compression spring in a stressed condition in a locked rest position, thereby to form a force storage means for producing a belt tightening motion component such as to remove slack from the belt; a sensor means which has the compression spring as a movable inertia weight for releasing the locking means in response to an extreme variation in the speed of said vehicle; and a tension cable operatively connected to said belt tightening means and the safety belt and adapted to transmit the tightening motion component produced by the belt tightening means, to the safety belt wherein said housing is of a substantially tubular configuration, wherein said locking means comprises a plurality of locking elements arranged at at least substantially angular spacings from each other around the axis of the housing, and wherein the respective locking elements are pivotably secured in said housing by a ring means to establish the respective axis of pivotal movement of each thereof.

25. Apparatus as set forth in claim 24 wherein said ring means is of a resilient nature and enhances said unlocking moment.

26. Apparatus for tightening a safety belt in a vehicle, for removing slack from a safety belt in a fitted condition, comprising: a belt tightening menas including a housing, a compression spring disposed in the housing, and a locking mans which is adapted to hold said compression spring in a stressed condition in a locked rest positon, thereby to form a force storage means for producing a belt tightening motion component such as to remove slack from the belt; a sensor means which has the compression spring as a movable inertia weight for releasing the locking means in response to an extreme variation in the speed of said vehicle; and a tension cable operatively connected to said belt tightening means and the safety belt and adapted to transmit the tightening motion component produced by the belt tightening means, to the safety belt wherein said reverse motion locking means comprises a tube member (braking tube member) arranged in coaxial relationship in said housing, and further including in said braking tube member a retaining portion of generally elliptical configuration which is connected to said tension cable and which is adapted to be guided freely movably in a defined included position in said braking tube member in the rest condition of the apparatus and in a belt tightening direction of movement of said tension cable, the retaining portion being adapted to be moved by a tilting movement into a clamping retaining position to resist an oppositely directed movement.

27. Apparatus as set forth in claim 26 wherein said retaining portion is of a plate-like configuration and further including a guide surface in said housing which is disposed in incluined relationship relative to the axis of said housing, for guiding said retaining portion and holding it in an inclined position within said housing in said rest condition of the apparatus and in the belt tightening direction of movement, the arrangement being such that said retaining portion is adapted to be tilted into said clamping retaining position by a pulling force applied to said tension cable in the opposite direction to said belt tightening direction of movement.

28. Apparatus as set forth in claim 26 wherein a space is provided between said housing and said braking tube member disposed in coaxial relationship within same, and wherein said compression spring is a coil spring disposed in said space.

29. Apparatus as set forth in claim 26 wherein said compression spring has an end connected to said tension cable, and further including a guide tube member telescopically guided in said braking tube member, for guiding said end of said compression spring.

30. Apparatus as set forth in claim 26 wherein said braking tube member has an inside wall surface provided with a plurality of groove means, each groove means being disposed in a plane normal to the axis of the tube member.

31. Apparatus as set forth in claim 30 wherein said groove means have inclined side surface defining same.

* * * * *